(12) United States Patent
Pettersson et al.

(10) Patent No.: US 11,743,502 B2
(45) Date of Patent: Aug. 29, 2023

(54) COMPACT DESCRIPTION OF REGION-WISE PACKING INFORMATION

(71) Applicant: Telefonaktiebolaget LM Ericsson (publ), Stockholm (SE)

(72) Inventors: Martin Pettersson, Vallentuna (SE); Rickard Sjöberg, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 17/257,909

(22) PCT Filed: Jun. 4, 2019

(86) PCT No.: PCT/EP2019/064539
§ 371 (c)(1),
(2) Date: Jan. 5, 2021

(87) PCT Pub. No.: WO2020/007554
PCT Pub. Date: Jan. 9, 2020

(65) Prior Publication Data
US 2021/0281882 A1 Sep. 9, 2021

Related U.S. Application Data

(60) Provisional application No. 62/694,406, filed on Jul. 5, 2018.

(51) Int. Cl.
*H04N 19/70* (2014.01)
*H04N 19/17* (2014.01)
(Continued)

(52) U.S. Cl.
CPC ........... *H04N 19/70* (2014.11); *H04N 13/178* (2018.05); *H04N 19/17* (2014.11); *H04N 19/597* (2014.11);
(Continued)

(58) Field of Classification Search
CPC ...... H04N 19/70; H04N 19/17; H04N 19/597; H04N 13/178; H04N 21/440245;
(Continued)

(56) References Cited

U.S. PATENT DOCUMENTS

2013/0016786 A1* 1/2013 Segall .................. H04N 19/174
375/E7.123
2017/0134743 A1* 5/2017 Sim ...................... H04N 19/124
(Continued)

OTHER PUBLICATIONS

Author Unknown, "Information technology—High efficiency coding and media delivery in heterogeneous environments—Part 2: High Efficiency Video Coding," International Organization for Standardization (ISO) / International Electrotechnical Commission (IEC) HTC 1/SC 29/WG 11 N 17661, ISO/IEC DIS 23008-2:201x(E) for 4th Edition, Apr. 20, 2018, 874 pages.
(Continued)

*Primary Examiner* — Richard T Torrente
(74) *Attorney, Agent, or Firm* — Withrow & Terranova, PLLC

(57) ABSTRACT

There are provided mechanisms for signaling region information in a bitstream for region-wise unpacking of regions from a packed picture to a projected picture. The method comprises defining a scale factor that is common for all regions of a picture. The method comprises signaling the scale factor in the bitstream. The method further comprises, for each of at least one region of a picture, applying the scale factor to each item of the region information for the region to produce a set of scaled values. The method comprises signaling the scaled values in the bitstream. Mechanisms for parsing region information from a bitstream for region-wise unpacking of regions from a packed picture to a projected picture are also provided.

8 Claims, 8 Drawing Sheets

(51) Int. Cl.
  *H04N 19/597* (2014.01)
  *H04N 13/178* (2018.01)
  *H04N 21/4402* (2011.01)
  *H04N 21/81* (2011.01)
  *H04N 21/854* (2011.01)
  *G06T 3/40* (2006.01)
  *G06T 3/00* (2006.01)

(52) U.S. Cl.
  CPC .............. *G06T 3/005* (2013.01); *G06T 3/40* (2013.01); *H04N 21/440245* (2013.01); *H04N 21/816* (2013.01); *H04N 21/85406* (2013.01)

(58) Field of Classification Search
  CPC .......... H04N 21/816; H04N 21/85406; H04N 13/194; H04N 19/174; H04N 19/46
  See application file for complete search history.

(56) References Cited

U.S. PATENT DOCUMENTS

| | | | | |
|---|---|---|---|---|
| 2018/0176468 A1* | 6/2018 | Wang | .................... | H04N 23/698 |
| 2019/0230285 A1* | 7/2019 | Kim | ....................... | H04N 19/13 |
| 2019/0297132 A1* | 9/2019 | Wang | .................... | H04L 65/752 |
| 2020/0112710 A1* | 4/2020 | Oh | ........................ | H04N 19/174 |
| 2020/0137136 A1* | 4/2020 | Skupin | ................. | H04N 19/176 |

OTHER PUBLICATIONS

Choi, Byeongdoo, et al., "OMAF PACK-VE: Multi-patch based Packing for omnidirectional video," International Organisation for Standisation (ISO), ISO/IEC JTC1/SC29/WG11 MPEG2017/M39841, Samsung Electronics, Geneva, Jan. 2017, 6 pages.

Fuldseth, Arild, et al., "Tiles for Managing Computational Complexity of Video Encoding and Decoding," 2012 Pcture Coding Symposium, Krakow, Poland, May 7-9, 2012, pp. 389-392.

Pettersson, Martin, et al., "[OMAF] On Compact Description of Region-Wise Packing Information," International Organisation for Standisation (ISO), ISO/IEC JTC1/SC29/WG11 MPEG2018/m43436, Ericsson, Ljubljana, Slovenia, Jul. 2018, 26 pages.

Wang, Ye-Kui, et al., "[OMAF] Editor's Input Text for OMAF WD Based on Finland AHG Agreements," International Organisation for Standisation (ISO), ISO/IEC JTC1/SC29/WG11/M42923-v1, OMAF v2 Editors, Ljubljana, Slovenia, Jul. 2018, 203 pages.

International Search Report and Written Opinion for International Patent Application No. PCT/EP2019/064539, dated Sep. 2, 2019, 12 pages.

* cited by examiner

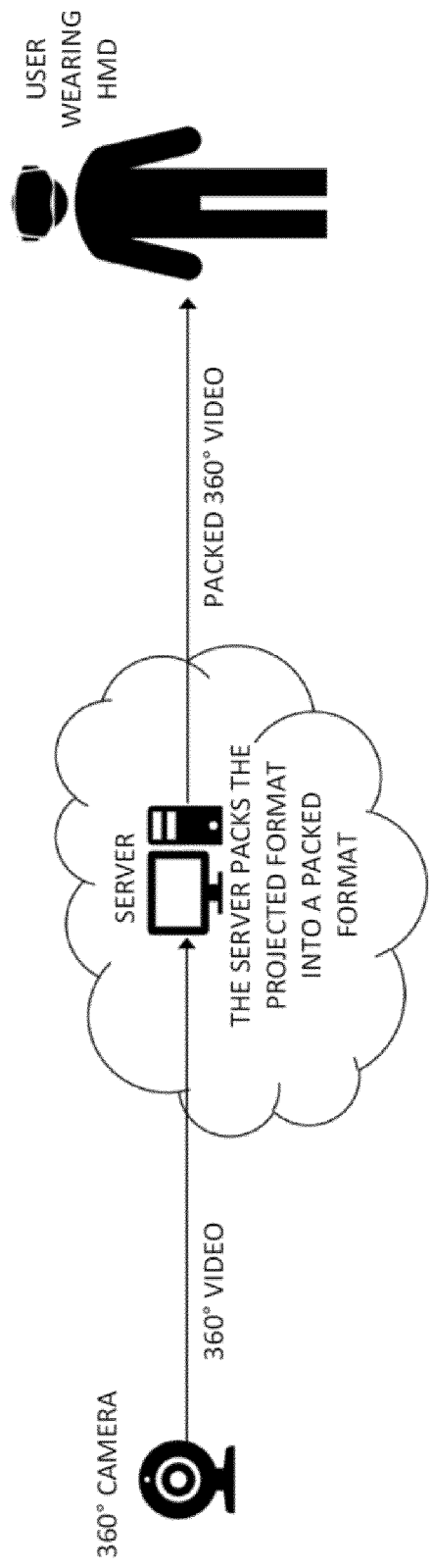
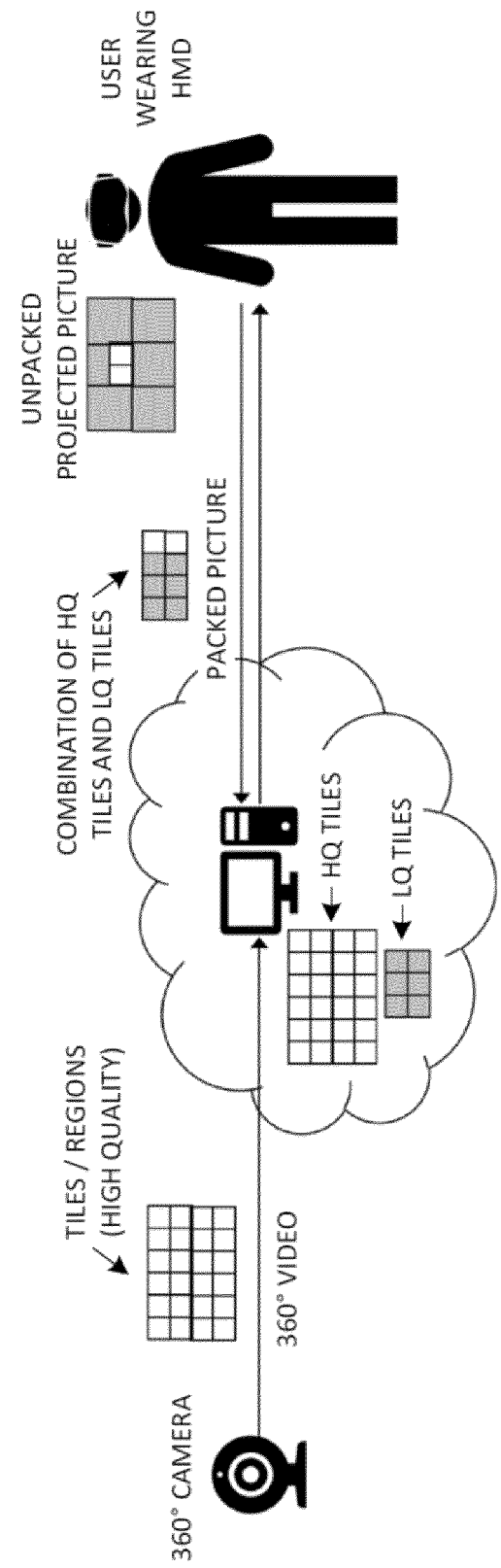

COMPACT DESCRIPTION OF REGION-WISE PACKING INFORMATION

This application is a 35 U.S.C. § 371 national phase filing of International Application No. PCT/EP2019/064539, filed Jun. 4, 2019, which claims the benefit of U.S. Provisional Application No. 62/694,406, filed Jul. 5, 2018, the disclosures of which are incorporated herein by reference in their entireties.

TECHNICAL FIELD

Embodiments herein relate to the field of signaling of omnidirectional video over the internet. In particular, embodiments herein relate to a method and a video encoder for signaling region information in a bitstream for region-wise unpacking of regions from a packed picture to a projected picture. Embodiments herein relate to a method and a video decoder for parsing region information from a bitstream for region-wise unpacking of regions from a packed picture to a projected picture. Corresponding computer programs therefor are also disclosed.

BACKGROUND

In recent years Virtual Reality (VR) has become increasingly popular as a new technology, including advances in Head-Mounted displays (HMD), which moves the barrier to make good quality VR more accessible to the mass market. Use cases for VR include gaming and VR video. VR video is also known as omnidirectional video, 360° video, or 360 video.

360° Video and Omnidirectional Media Format (OMAF)

Motion Picture Experts Group (MPEG) has an ongoing standardization activity for developing a media format for omnidirectional video called OMAF. In combination with signaling enablers such as Dynamic Adaptive Streaming over Hypertext Transfer Protocol (HTTP) (DASH), OMAF is used to support signaling of omnidirectional video over the Internet. In the first version of OMAF two video codecs are supported, Advanced Video Coding (AVC)/H.264 and High Efficiency Coding (HEVC). Both codecs have been developed in the Joint Collaboration Team on Video Coding (JCT-VC), a collaboration effort between MPEG and ITU-T. MPEG and the Telecommunication Standardization Sector of the International Telecommunications Union (ITU-T) are currently working on the next generation video codec, referred to as Versatile Video Codec (VVC), within the Joint Video Experts Team (JVET). VVC, which is likely to be supported by a future version of OMAF, is anticipated to have even better support for omnidirectional video than AVC and HEVC. Depending on the camera or rig of cameras and how the camera is capturing the video, different projection formats exist. Two common projection formats supported by OMAF are cube map projection and equirectangular projection.

FIG. 1 shows an example of a typical cube map. The cube map projection is built using six two-dimensional (2D) video projections representing the six faces of a cube, e.g., front, back, left, right, top, and bottom. A cube map video may be created by capturing 2D video with six cameras in six different orthogonal directions, e.g., facing forward, facing backward, facing left, facing right, facing up, and facing down.

FIG. 2 shows an example of an equirectangular projection format, which can be compared to a world map, where the equator is ranging from left to right and with the pixels at the poles stretched along the top and bottom borders. The granularity is thus higher at the poles. The left side of FIG. 3 shows an unpacked equirectangular projection, labeled "unpacked picture".

In order to efficiently compress 360° video captured by a camera, the projected video format acquired from the camera is typically packed into a format that is more suitable for compression. Using FIG. 2 as an example, since the poles in equirectangular projections have higher granularity than the rest of the projected picture, the packed picture for compression may be compressed in terms of pixels at the poles.

FIG. 3 shows an example of a picture before packing (left) and after packing (right), where the "poles" regions are pixel-packed but the "equator" region is not pixel-packed. The pixel-packed picture on the right side of FIG. 3 is more suitable for compression. It is noted that "packing" and "compression" are distinct operations.

FIG. 4 illustrates an example of a typical use case for 360° video, where a 360° camera captures a scene and sends the 360° video to a server. The server packs the projected format into a packed format and sends the packed video to a user with a HMD device, e.g., using OMAF and DASH. Note that the resolution of the projected picture may be larger than the resolution of the packed picture.

One observation that is easy to make is that the user only sees the video content in one direction at a time. What is seen by the user is referred to as the viewpoint. What is outside the viewpoint is not seen by the user and it is wasteful to send video data in this area, at least in high quality.

Tiled Video

One of the features in OMAF is to support tiling of video. Tiles of a picture are sometimes referred to as regions of a picture. A tiled video is built up by a number of tiles that are independently coded from each other, which means that a single tile can be extracted from the encoded bitstream and also be independently decoded. This is utilized in 360° video streaming to only send the tiles that are covering the current viewport in high quality. The other tiles may be skipped or transmitted at a lower quality.

FIG. 5 shows an example of a typical use case where tiles are utilized to enable high quality for the viewport and lower quality for the other area. In FIG. 5, a camera captures 360° video, shown as a series of High Quality (HQ) tiles, and sends it to a server. The server creates an HQ version of the 360° video (shown as white-filled tiles) and a Low Quality (LQ) version of the 360° video (shown as grey-filled tiles), and prepares to use OMAF and DASH to stream the video to a user with a HMD device. In the example in FIG. 5, the HMD device detects in what direction the user is viewing and requests high quality tiles for the viewport and low quality tiles for the remaining area. The server packs the requested high quality tiles and low quality tiles into a packed video picture and sends it to the HMD. The HMD unpacks the picture and projects the packed tiles at the right place on the projected picture.

Guard Bands

In OMAF, there is an option to use guard bands in the packed picture to improve the image quality when stitching tiles for projection. Guard bands may be used to seamlessly blend the borders between two regions. A guard band is defined in OMAF as an area in a packed picture that is not rendered but may be used to improve the rendered part of the packed picture to avoid or mitigate visual artifacts such as seams. For example, a guard band may contain actual image data from an adjacent tile (which may or may not be the same resolution as the image data in the packed region that the guard bands surround) or it may be filled with the same color as the color at the perimeter of the packed region.

FIG. 6 illustrates an example of a projected picture with a projected region (left) and its corresponding packed region in a packed picture with guard bands around it (right).

Region-Wise Packing

OMAF supports 255 different regions for the packed picture. The region-wise packing in OMAF defines how regions in the packed picture are unpacked into regions in the projected picture. After decoding the regions in the packed picture, the regions are projected to the regions of the projected picture.

The syntax and semantics of the region-wise packing in the current OMAF version 2 working draft (WD)—m42923-v1—is shown below:

---

7.5.3.6 Syntax of the region-wise packing structure

---

```
aligned(8) class RegionWisePackingStruct( ) {
    unsigned int(1) constituent_picture_matching_flag;
    bit(7) reserved = 0;
    unsigned int(8) num_regions;
    unsigned int(32) proj_picture_width;
    unsigned int(32) proj_picture_height;
    unsigned int(16) packed_picture_width;
    unsigned int(16) packed_picture_height;
    for (I = 0; I < num_regions; i++) {
        bit(3) reserved = 0;
        unsigned int(1) guard_band_flag[i];
        unsigned int(4) packing_type[i];
        if (packing_type[i] == 0) {
            RectRegionPacking(i);
            if (guard_band_flag[i])
                GuardBand(i);
        }
    }
}
```

7.5.3.7 Semantics of the region-wise packing structure constituent_picture_matching_flag equal to 1 specifies that the projected region information, packed region information, and guard band region information in this syntax structure apply individually to each constituent picture and that the packed picture and the projected picture have the same stereoscopic frame packing format. constituent_picture_matching_flag equal to 0 specifies that the projected region information, packed region information, and guard band region information in this syntax structure apply to the projected picture. When SpatiallyPackedStereoFlag is equal to 0, constituent_picture_matching_flag shall be equal to 0.

NOTE 1: For the stereoscopic content that uses equivalent region-wise packing for the constituent pictures, setting this flag equal to 1 allows more compact signalling of region-wise packing information.

num_regions specifies the number of packed regions when constituent_picture_matching_flag is equal to 0. Value 0 is reserved. When constituent_picture_matching_flag is equal to 1, the total number of packed regions is equal to 2 * num_regions and the information in RectRegionPacking(i) and GuardBand(i) applies to each constituent picture of the projected picture and the packed picture.

proj_picture_width and proj_picture_height specify the width and height, respectively, of the projected picture, in relative projected picture sample units. proj_picture_width and proj_picture_height shall both be greater than 0.

NOTE 2: The same sampling grid, width, and height are used for the luma sample array and the chroma sample arrays of the projected picture.

packed_picture_width and packed_picture_height specfy the width and height, respectively, of the packed picture, in relative packed picture sample units. packed_picture_width and packed_picture_height shall both be greater than 0.

guard_band_flag[i] equal to 0 specifies that the i-th packed region has no guard bands. guard_band_flag[i] equal to 1 specifies that the i-th packed region has at least one guard band.

packing_type[i] specifies the type of region-wise packing. The values of packing_type[i] and their semantics are specified in Table 5.2.

RectRegionPacking(i) specifies the region-wise packing between the i-th packed region and the i-th projected region. The syntax and semantics of RectRegionPacking(i) are specified in clauses 7.5.3.2 and 7.5.3.3, respectively.

GuardBand(i) specifies the guard bands for the i-th packed region. The syntax and semantics of GuardBand(i) are specified in clauses 7.5.3.4 and 7.5.3.5, respectively.

7.5.3.2 Syntax of the rectangular region packing structure

```
aligned(8) class RectRegionPacking(i) {
    unsigned int(32) proj_reg_width[i];
    unsigned int(32) proj_reg_height[i];
    unsigned int(32) proj_reg_top[i];
```

-continued 7.5.3.6 Syntax of the region-wise packing structure

```
        unsigned int(32) proj_reg_left[i];
        unsigned int(3) transform_type[i];
        bit(5) reserved = 0;
        unsigned int(16) packed_reg_width[i];
        unsigned int(16) packed_reg_height[i];
        unsigned int(16) packed_reg_top[i];
        unsigned int(16) packed_reg_left[i];
    }
7.5.3.3 Semantics of the rectangular region packing structure
    proj_reg_width[i], proj_reg_height[i], proj_reg_top[i], and
        proj_reg_left[i] specify the width, height, top offset, and left offset,
        respectively, of the i-th projected region, either within the projected picture
        (when constituent_picture_matching_flag is equal to 0) or within
        the constituent picture of the projected picture (when
        constituent_picture_matching_flag is equal to 1).
        proj_reg_width[i], proj_reg_height[i], proj_reg_top[i] and
        proj_reg_left[i] are indicated in relative projected picture sample units.
            NOTE 1: Two projected regions may partially or entirely overlap
                    with each other. When there is an indication of quality
                    difference, e.g., by a region-wise quality ranking
                    indication, then for the overlapping area of any two
                    overlapping projected regions, the packed region
                    corresponding to the projected region that is indicated to
                    have higher quality should be used for rendering.
    transform_type[i] specifies the rotation and mirroring that is applied to the
        i-th packed region to remap it to the i-th projected region. When
        transform_type[i] specifies both rotation and mirroring, rotation is
        applied before mirroring for converting sample locations of a packed region
        to sample locations of a projected region. The following values are specified:
            0: no transform
            1: mirroring horizontally
            2: rotation by 180 degrees (counter-clockwise)
            3: rotation by 180 degrees (counter-clockwise) before mirroring
            horizontally
            4: rotation by 90 degrees (counter-clockwise) before mirroring
            horizontally
            5: rotation by 90 degrees (counter-clockwise)
            6: rotation by 270 degrees (counter-clockwise) before mirroring
            horizontally
            7: rotation by 270 degrees (counter-clockwise)
                NOTE 2: Clause 5.4.2 specifies the semantics of
                        transform_type[i] for converting a sample location
                        of a packed region in a packed picture to a sample location
                        of a projected region in a projected picture.
    packed_reg_width[i], packed_reg_height[i], packed_reg_top[i],
        and packed_reg_left[i] specify the width, height, the offset, and the left
        offset, respectively, of the i-th packed region, either within the packed picture
        (when constituent_picture_matching_flag is equal to 0) or within
        each constituent picture of the packed picture (when
        constituent_picture_matching_flag is equal to 1).
        packed_reg_width[i], packed_reg_height[i],
        packed_reg_top[i], and packed_reg_left[i] are indicated in relative
        packed picture sample units. packed_reg_width[i],
        packed_reg_height[i], packed_reg_top[i], and
        packed_reg_left[i] shall represent integer horizontal and vertical
        coordinates of luma sample units within the decoded pictures.
            NOTE 3: Two packed regions may partially or entirely overlap with
                    each other.
7.5.3.4 Syntax of the guard band structure
aligned(8) class GuardBand(i) {
        unsigned int(8) left_gb_width[i];
        unsigned int(8) right_gb_width[i];
        unsigned int(8) top_gb_height[i];
        unsigned int(8) bottom_gb_height[i];
        unsigned int(1) gb_not_used_for_pred_flag[i];
        for (j = 0; j < 4; j++)
            unsigned int(3) gb_type[i][j];
        bit(3) reserved = 0;
    }
7.5.3.5 Semantics of the guard band structure
    left_gb_width[i] specifies the width of the guard band on the left side of the
        i-th packed region in relative packed picture sample units. When the decoded
        picture has 4:2:0 or 4:2:2 chroma format, left_gb_width[i] shall
        correspond to an even number of luma samples within the decoded picture.
```

| 7.5.3.6 Syntax of the region-wise packing structure |
|---|
| right_gb_width[i] specifies the width of the guard band on the right side of the i-th packed region in relative packed picture sample units. When the decoded picture has 4:2:0 or 4:2:2 chroma format, right_gb_width[i] shall correspond to an even number of luma samples within the decoded picture.<br>top_gb_height[i] specifies the height of the guard band above the i-th packed region in relative packed picture sample units. When the decoded picture has 4:2:0 chroma format, top_gb_height[i] shall correspond to an even number of luma samples within the decoded picture.<br>bottom_gb_height[i] specifies the height of the guard band below the i-th packed region in relative packed picture sample units. When the decoded picture has 4:2:0 chroma format, bottom_gb_height[i] shall correspond to an even number of luma samples within the decoded picture.<br>When GuardBand(i) is present, at least one of left_gb_width[i], right_gb_width[i], top_gb_height[i], or bottom_gb_height[i] shall be greater than 0.<br>gb_not_used_for_pred_flag[i] equal to 0 specifies that the guard bands may or may not be used in the inter prediction process.<br>  gb_not_used_for_pred_flag[i] equal to 1 specifies that the sample values of the guard bands are not used in the inter prediction process.<br>    NOTE 1: When gb_not_used_for_pred_flag[i] is equal to 1, the sample values within guard bands in decoded pictures could be rewritten even if the decoded pictures were used as references for inter prediction of subsequent pictures to be decoded. For example, the content of a packed region could be seamlessly expanded to its guard band with decoded and re-projected samples of another packed region.<br>gb_type[i][j] specifies the type of the guard bands for the i-th packed region as follows, with j equal to 0, 1, 2, or 3 indicating that the semantics below apply to the left, right, top, or bottom edge, respectively, of the packed region:<br>  - gb_type[i][j] equal to 0 specifies that the content of the guard bands in relation to the content of the packed regions is unspecified. When gb_not_used_for_pred_flag[i] is equal to 0, gb_type[i][j] shall not be equal to 0.<br>  - gb_type[i][j] equal to 1 specifies that the content of the guard bands suffices for interpolation of sub-pixel values within the packed region and less than one pixel outside of the boundary of the packed region.<br>    NOTE 2: gb_type[i][j] equal to 1 could be used when the boundary samples of a packed region have been copied horizontally or vertically to the guard band.<br>  - gb_type[i][j] equal to 2 specifies that the content of the guard bands represents actual picture content that is spherically adjacent to the content in the packed region and is on the surface of the packed region at quality that gradually changes from the picture quality of the packed region to that of the spherically adjacent packed region.<br>  - gb_type[i][j] equal to 3 specifies that the content of the guard bands represents actual picture content that is spherically adjacent to the content in the packed region and is on the surface of the packed region at the picture quality of the packed region.<br>  - gb_type[i][j] values greater than 3 are reserved. |

SUMMARY

There currently exist certain challenge(s) with the existing solutions. One problem with the existing implementations of OMAF is that the signaling overhead for region-wise packing information in OMAF is unnecessarily large. The most expensive part is the fields in RectRegionPacking. The bit cost for just one region is 32*4+8+16*4=200 bits. If all regions are utilized the bit cost becomes 255*200 bits=51,000 bits=6,375 bytes. A more common use case may be 100 regions which becomes 20,000 bits=2,500 bytes.

Certain aspects of the present disclosure and their embodiments may provide solutions to the aforementioned challenges. One aspect of the proposed solution is to have a more compact description of the information of the region-wise packing information in OMAF.

A first aspect of the embodiments defines a method, performed by an encoder, for signaling region information in a bitstream for region-wise unpacking of regions from a packed picture to a projected picture. The method comprises defining a scale factor that is common for all regions of a picture. The method comprises signaling the scale factor in the bitstream. The method further comprises, for each of at least one region of a picture, applying the scale factor to each item of the region information for the region to produce a set of scaled values. The method comprises signaling the scaled values in the bitstream.

A second aspect of the embodiments defines an encoder, for signaling region information in a bitstream for region-wise unpacking of regions from a packed picture to a projected picture. The encoder comprises processing means operable to define a scale factor that is common for all regions of a picture. The encoder comprises processing means operable to signal the scale factor in the bitstream. The encoder comprises processing means operable to, for each of at least one region of a picture, apply the scale factor to each item of region information for the region to produce a set of scaled values. The encoder comprises processing means operable to signal the scaled values in the bitstream.

A third aspect of the embodiments defines a computer program, for signaling region information in a bitstream for region-wise unpacking of regions from a packed picture to a projected picture. The computer program comprises code means which, when run on a computer, causes the computer to define a scale factor that is common for all regions of a picture. The computer program comprises code means which, when run on a computer, causes the computer to signal the scale factor in the bitstream. The computer program comprises code means which, when run on a computer, causes the computer to, for each of at least one region of a picture, apply the scale factor to each item of region information for the region to produce a set of scaled values and signal the scaled values in the bitstream.

A fourth aspect of the embodiments defines a computer program product comprising computer readable means and a computer program according to the third aspect, stored on the computer readable means.

A fifth aspect of the embodiments defines a method, performed by a decoder, for parsing region information from a bitstream for region-wise unpacking of regions from a packed picture to a projected picture. The method comprises determining that a scale factor should be used. The method comprises, upon a determination that a scale factor should be used, parsing the bitstream to determine a scale factor. The method comprises, for each of at least one region of a picture, for each item in the region information for the region parsing the bitstream to determine a scaled value for the item and applying the scale factor to the scaled value to produce an unscaled value for the item in the region information.

A sixth aspect of the embodiments defines a decoder, for parsing region information from a bitstream for region-wise unpacking of regions from a packed picture to a projected picture. The decoder comprises processing means operable to determine that a scale factor should be used. The decoder comprises processing means operable to, upon a determination that a scale factor should be used, parse the bitstream to determine a scale factor. The decoder comprises processing means operable to, for each of at least one region of a picture, for each item in the region information for the region, parse the bitstream to determine a scaled value for the item and apply the scale factor to the scaled value to produce an unscaled value for the item in the region information.

A seventh aspect of the embodiments defines a computer program, for parsing region information from a bitstream for region-wise unpacking of regions from a packed picture to a projected picture. The computer program comprises code means which, when run on a computer, causes the computer to determine that a scale factor should be used. The computer program comprises code means which, when run on a computer, causes the computer to, upon a determination that a scale factor should be used, parse the bitstream to determine a scale factor. The computer program comprises code means which, when run on a computer, causes the computer to, for each of at least one region of a picture, for each item in the region information for the region, parse the bitstream to determine a scaled value for the item and apply the scale factor to the scaled value to produce an unscaled value for the item in the region information.

An eighth aspect of the embodiments defines a computer program product comprising computer readable means and a computer program according to the seventh aspect, stored on the computer readable means.

A ninth aspect of the embodiments defines a carrier containing the computer programs according to the third and seventh aspect. The carrier is one of an electronic signal, optical signal, radio signal, or computer readable storage medium.

According to a first embodiment of the present invention, a scaling factor that is common for all regions is used to minimize the signaled bit size of height, width, top offset and left offset for each region. For example, instead of requiring 32 or 16 bits for signaling each of height, width, top offset, left offset, a smaller number of bits (e.g., 8 bits) is sufficient.

According to a second embodiment of the present invention, flags may be used to signal whether all packed regions have the same size, whether all projected regions have the same size, whether the packed and/or projected regions are in raster scan order, or some combination of the above. If so, all regions after the first one copies the size from the first region and the top and left offsets are derived from the region index, region size and the picture size.

According to a third embodiment, a flag may be used to signal whether all guard bands have a common size, the size of which may be explicitly provided or which may be signaled as being a previously agreed-upon size.

Certain embodiments may provide one or more of the following technical advantage(s). One advantage of the proposed solution is that the signaling of the region-wise packing information requires fewer bits than the current solution. This means that fewer bits need to be stored and transmitted.

According to the first embodiment, each region requires 8*4+8*4=72 bits. For 100 regions this becomes 7,200+2*16 bits=902 bytes. Thus, 2,500−902=1,598 bytes can be saved.

According to the second embodiment, only the size of the first region is signaled, i.e. 32*2+16*2, in addition to 8 bits per region for the transform type and the reserved bits. For 100 regions this becomes 32*2+16*2+8*100=896 bits=112 bytes. Thus, 2,500−112=2,388 bytes can be saved.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

BRIEF DESCRIPTION OF THE DRAWINGS

FIG. 4 illustrates an example of a typical use case for 360° video, where a 360° camera captures a scene and sends the 360° video to a server.

FIG. 5 shows an example of a typical use case where tiles are utilized to enable high quality for the viewport and lower quality for the other area.

DETAILED DESCRIPTION

The accompanying drawings, which are incorporated herein and form part of the specification, illustrate various embodiments of the present invention and, together with the description, further serve to explain the principles of the invention and to enable a person skilled in the art to make and use the invention.

Typically, an image may be divided into regions, which are further subdivided into portions operated upon by the codec. These portions are called Coding Units (CUs). In HEVC the largest coding unit is called a Coding Tree Unit (CTU) and in AVC it is called Macro Block (MB).

Figure 7:
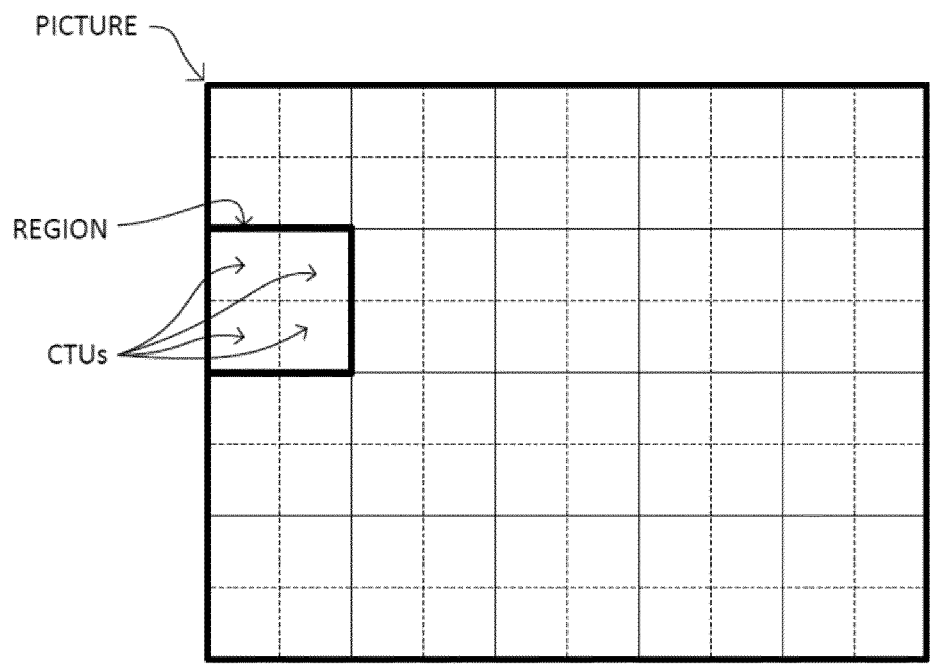
FIG. 7 illustrates an example of regions and CTUs within a picture; regions are marked with solid lines and the CTUs are marked with dashed and solid lines.

FIG. 7 illustrates an example of regions and CTUs within a picture. In FIG. 7, regions are marked with solid lines and the CTUs are marked with dashed and solid lines. For example, each CTU may be 64×64 pixels. In the example shown in FIG. 7, each region contains four CTUs. A CTU's encoding may depend upon the coding of another CTU within the same region, and thus a CTU may not belong to more than one region.

Figure 8:
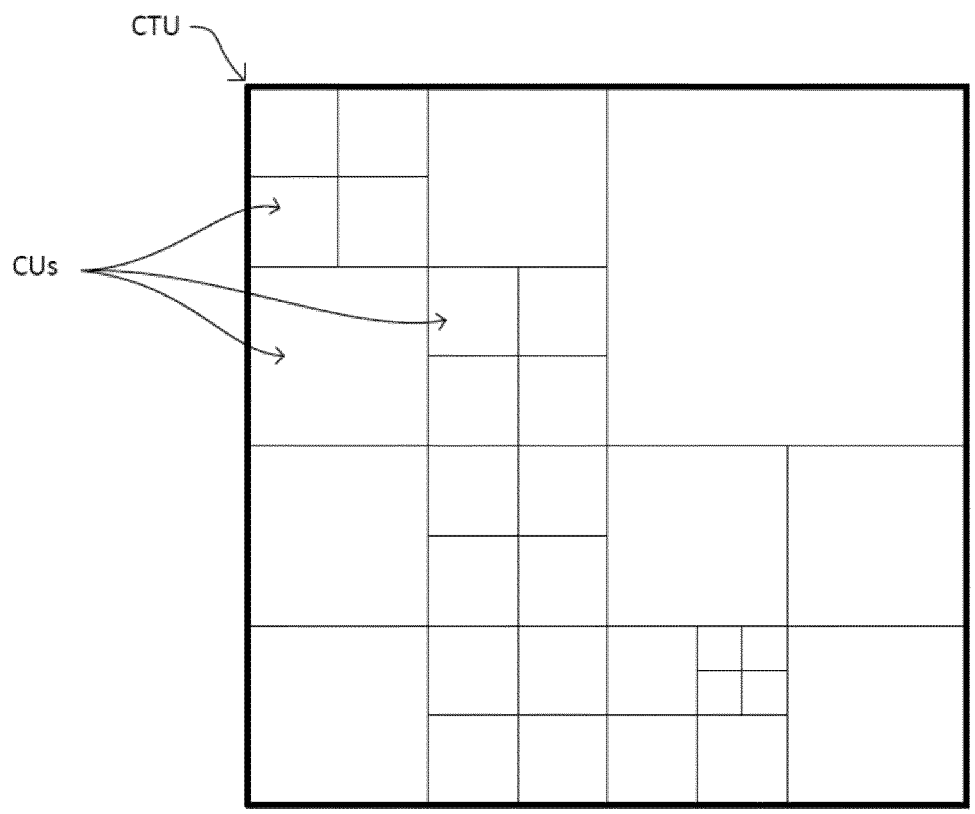
FIG. 8 illustrates an example CTU that is constructed of many smaller CUs of different sizes: the outer square is a CTU and the 31 inner squares are CUs.

FIG. 8 illustrates an example CTU that is constructed of many smaller CUs of different sizes. In FIG. 8, the outer square is a CTU and the 31 inner squares are CUs. HEVC does not prohibit a CU from predicting from other CUs (above and left) in the same CTU.

The present embodiments generally relate to a method and a video encoder for signaling region information in a bitstream for region-wise unpacking of regions from a packed picture to a projected picture, as well as a method and a video decoder for parsing region information from a bitstream for region-wise unpacking of regions from a packed picture to a projected picture.

Figure 11:
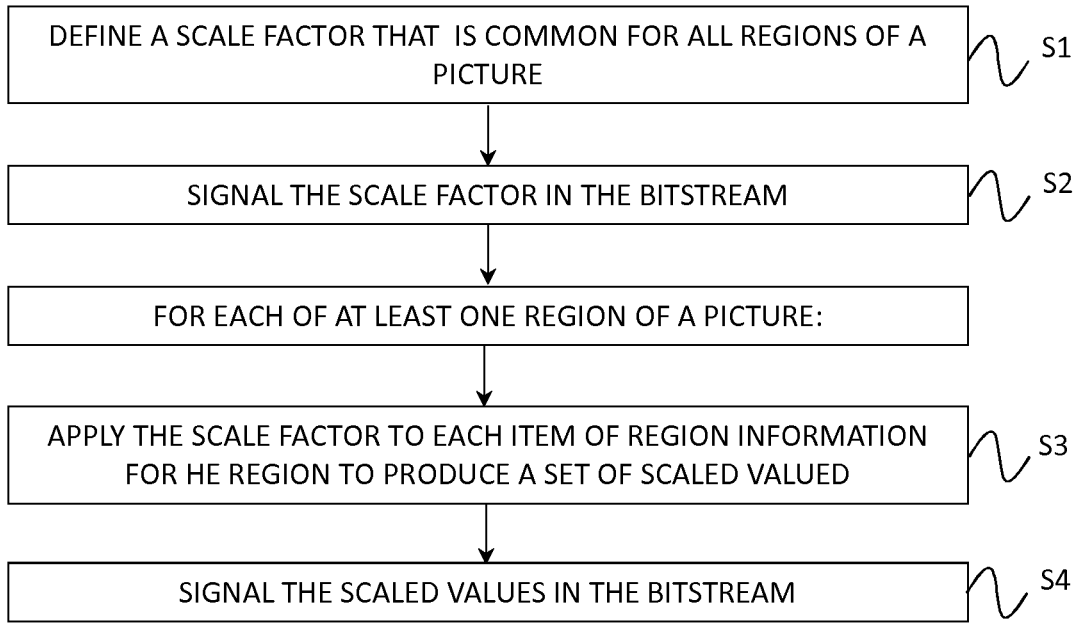
FIG. 11 illustrates the steps performed in an encoding method, for signaling region information in a bitstream for region-wise unpacking of regions from a packed picture to a projected picture, according to the embodiments of the present invention.

According to one aspect, a method, performed by an encoder, for signaling region information in a bitstream for region-wise unpacking of regions from a packed picture to a projected picture is provided, as shown in FIG. 11.

The method comprises a step S1 of defining a scale factor that is common for all regions of a picture. This is related to an observation that the sizes of the packed (and sometimes the projected) regions are typically based on the largest CU of the codec used to compress the pictures of the video. In HEVC, for example, the largest CU is a CTU, and regions are therefore multiples of CTUs. In FIG. 7, each region contains 4 CTUs.

Thus, a scale factor that is common for all regions is defined and used according to the embodiments of the present invention. This scale factor only needs to be signaled once. The scale factor may be the size of the largest coding unit or another greatest common divisor of all the sizes and positions of all the regions in the picture. For each region, a scaled value is then signaled for each of height, width, top offset and left offset. These values are then multiplied with the scale factor to reconstruct the height, width, top offset and left offset of the regions. The scaled values of the width, height, top offset and left offset of the regions may be signaled with lower precision than in state-of-the art which will save bits if the number of regions is larger than 1.

For example, if a region's height and width are always integer multiples of a CTU, the dimensions of a region may be defined in terms of "numbers of CTUs", i.e., each region in FIG. 7 has a width of 2 and a height of 2. Thus, the number of bits needed to indicate the width and height of each region is reduced from the number of bits sufficient to indicate the number of pixels to the number of bits sufficient to indicate the number of CTUs.

The method further comprises a step S2 of signaling the scale factor in the bitstream.

The method further comprises, for each of at least one region of a picture, a step S3 of applying the scale factor to each item of region information for the region to produce a set of scaled values. The region information may comprise region width, region height, top offset of region in picture, left offset of region in picture, transform type and guard band information. The region information may comprise region information for projected regions, region information for packed regions or region information for both projected and packed regions.

Step S3 of applying the scale factor to each item of region information for the region may comprise dividing the value of each item of region information by the scale factor.

The method comprises, for each of at least one region of a picture, a step S4 of signaling the scaled values in the bitstream.

The method may further comprise a step S5 of including in the bitstream a scaling flag to signal whether or not the region information should be scaled. The method may further comprise a step S6 of including in the bitstream a sizing flag to signal whether or not all regions in the picture have the same size. As an example, if the sizing flag is set to a first value, only the size of the first region of the picture is signaled, and if the sizing flag is set to a second value, the sizes of all regions in the picture are explicitly signaled.

The method may, upon performing steps S1-S4, further comprise a step S7 of including in the bitstream a common size flag to signal whether or not some regions in the picture have a common size. As an example, if the common size flag is set to a first value, the common size is signaled in the bitstream and for each region a use common size flag is included in the bitstream to signal whether the size of the region should be copied from the common size or whether the size of the region is explicitly signaled in the bitstream.

The method may further comprise a step S8 of including in the bitstream a raster flag to signal whether or not all regions in the picture are ordered according to raster scan order.

Figure 12:
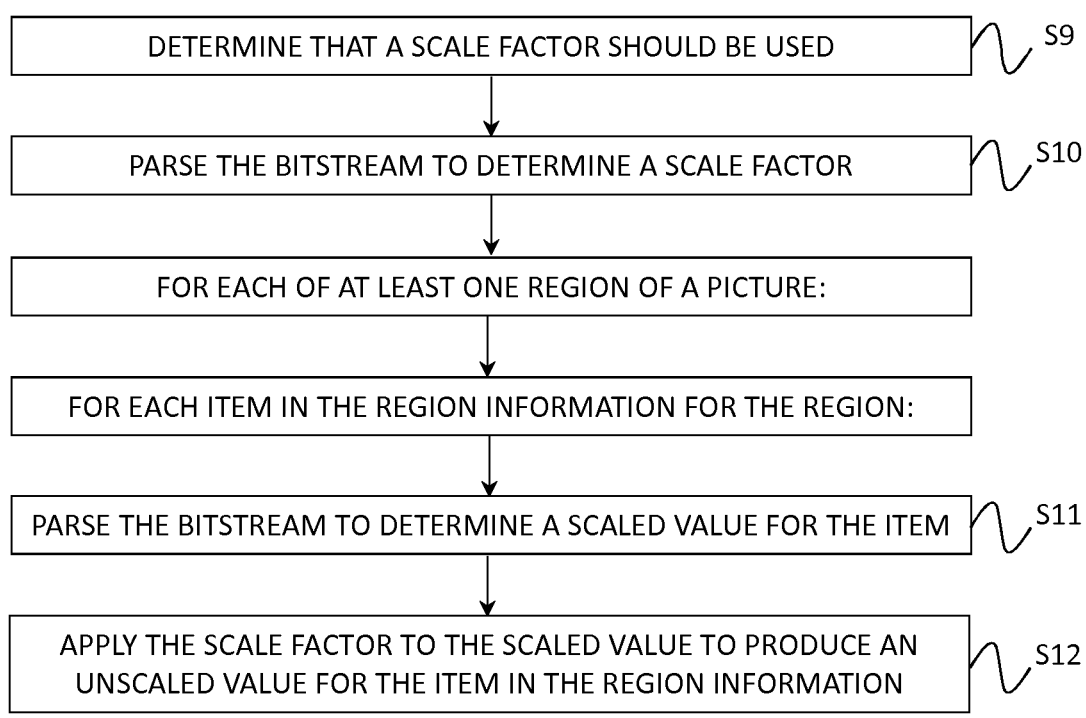
FIG. 12 illustrates the steps performed in a decoding method, for parsing region information from a bitstream for region-wise unpacking of regions from a packed picture to a projected picture, according to the embodiments of the present invention.

According to another aspect, a method, performed by a video decoder, for parsing region information from a bitstream for region-wise unpacking of regions from a packed picture to a projected picture is provided, as shown in FIG. 12. The method comprises a step S9 of determining that a scale factor should be used. As an example, step S9 may comprise parsing from the bitstream a scaling flag that signals whether the region information should be scaled.

The method further comprises, upon a determination that a scale factor should be used, a step S10 of parsing the bitstream to determine a scale factor. The method further comprises, for each of at least one region of a picture and for each item in the region information for the region, a step S11 of parsing the bitstream to determine a scaled value for the item and a step S12 of applying the scale factor to the scaled value to produce an unscaled value for the item in the region information. As an example, step S12 may comprises multiplying the scaled value of each item of region information by the scale factor.

Similarly to what is described above for the encoding method, the region information may comprise region width, region height, top offset of region in picture, left offset of region in picture, transform type or guard band information. Likewise, the region information may comprise region information for projected regions, region information for packed regions or region information for both projected and packed regions.

The method may further comprise a step S13 of determining whether or not all regions in the picture have the same size. The method may further comprise, upon a determination that all regions in the picture have the same size, a step S14 of parsing only the size of the first region of the picture. The method further comprises, upon a determination that not all regions in the picture have the same size, a step of S15 of parsing the sizes of all regions in the picture. Determining whether or not all regions in the picture have the same size may comprise parsing the bitstream for a sizing flag that signals whether or not all regions in the picture have the same size.

The method may further comprise, after performing steps S9-S12, a step of S16 of determining whether or not some regions in the picture have a common size. The method may further comprise, upon a determination that some regions in the picture have a common size, for each region, a step S17 of determining whether the region is the common size. Upon a determination that the region is the common size, the method may further comprise a step S18 of using the common size as the size for that region. Upon a determination that the region is not the common size, the method may further comprise a step S19 of parsing the bitstream for the size for that region. Upon a determination that some regions in the picture do not have a common size, for each region, the method may further comprise a step S20 of parsing the bitstream for the size of that region. Determining whether or not some regions in the picture have a common size may comprise parsing the bitstream for a common size flag and determining whether or not some regions in the picture have the common size based on the value of the common size flag. Determining whether a region is the common size may comprise, for each region, parsing the bitstream for a flag that signals whether or not the region is the common size.

The decoding method may even further comprise a step S21 of determining whether or not all regions in the picture are ordered according to a raster scan order. Upon a determination that all regions in the picture are ordered according to a raster scan order, the method may comprise a step S22 of parsing only the size of the first region of the picture and using the size of the first region to calculate X and Y offsets for the region. Upon a determination that not all regions in the picture are ordered according to a raster scan order, the method may comprise a step S23 of parsing the sizes of all regions in the picture and using the size of each region to calculate X and Y offsets for the region. Determining whether or not all regions in the picture are ordered according to a raster scan order of step S21 may comprise parsing the bitstream for a raster order flag that signals whether or not all regions in the picture are ordered according to a raster scan order.

Below are described some embodiments according to the present invention.

Embodiment 1—Scale Factor

According to a first embodiment of the present invention, a scaling factor that is common for all regions is used to minimize the signaled bit size of height, width, top offset and left offset for each region. For example, instead of requiring 32 or 16 bits for signaling each of height, width, top offset, left offset, a smaller number of bits (e.g., 8 bits) is sufficient.

The following example decoder steps apply for the parsing and construction of regions:

1. Parse a scale factor flag from a first codeword in bitstream;
2. If scale factor flag is equal to 1, parse a scale factor for each of projected and packed regions in the bitstream;
3. For each projected and/or packed region, parse a scaled width, height and top and left position;
4. Multiply each scaled width, height and top and left positions of each projected and/or packed region with the corresponding scaling factor to reconstruct the width, height and top and left positions of each projected and/or packed region;
5. Use the reconstructed width, height, top offset and left offset of at least one packed region to decode the at least one packed region; and 6. Project the at least one decoded packed region into at least one projected region using the width, height, top offset and left offset of the at least one packed region and the at least one projected region.

The following example encoder steps apply for the construction and signaling of regions:
1. Define regions for the projected and packed pictures where each region is defined by its width, height and top and left positions;
2. For each of projected and packed regions, derive a scaling factor that divides the width, height, and top and left position of each region into an integer number;
3. If any of the two derived scaling factors are larger than 1, set scale factor flag to 1, else set scale factor flag to 0. Signal the scale factor flag in the bitstream;
4. If scale factor flag is equal to 1, signal the scale factors for the projected regions and scale factor for the packed regions in the bitstream;
5. If the scale factor for the projected regions is 0, then the width, height, top offset and left offset of the projected regions are explicitly signaled in the bitstream; Otherwise, if the scale factor for the projected regions is larger than 0, then derive scaled width, scaled height, scaled top offset and scaled left offset by dividing the width, height, top offset and left offset by the scale factor for the projected regions. Signal the scaled width, scaled height, scaled top offset and scaled left offset for the projected regions in the bitstream;
6. If the scale factor for the packed regions is 0, then the width, height, top offset and left offset of the packed regions are explicitly signaled in the bitstream; Otherwise, if the scale factor for the packed regions is larger than 0, then derive scaled width, scaled height, scaled top offset and scaled left offset by dividing the width, height, top offset and left offset by the scale factor for the packed regions. Signal the scaled width, scaled height, scaled top offset and scaled left offset for the packed regions in the bitstream;
7. Project at least one projected region into at least one packed region using the width, height, top offset and left offset of the at least one packed region and the at least one projected region; and
8. Use the width, height, top offset and left offset of at least one packed region to encode the at least one packed region.

The following is an example of how the syntax tables from the current OMAF version 2 working draft (m42923v1) could be modified to support embodiment 1, with changes highlighted using bold font. An example of the full specification text of m42923v1, modified to support embodiment 1, can be found in appendix A.

Syntax for embodiment 1

```
aligned(8) class RegionWisePackingStruct( ) {
    unsigned int(1) constituent_picture_matching_flag;
    unsigned int(1) scale_factor_flag;
    bit(7) reserved = 0;
    bit(6) reserved = 0;
    if (scale_factor_flag) {
        unsigned int (16) scale_factor_proj;
        unsigned int (16) scale_factor_packed;
    }
    unsigned int(8) num_regions;
    unsigned int(32) proj_picture_width;
    unsigned int(32) proj_picture_height;
    unsigned int(16) packed_picture_width;
    unsigned int(16) packed_picture_height;
```

-continued

Syntax for embodiment 1

```
    for (i = 0; i < num_regions; i++) {
        bit(3) reserved = 0;
        unsigned int(1) guard_band_flag[i];
        unsigned int(4) packing_type[i];
        if (packing_type[i] == 0) {
            RectRegionPacking(i, scale_factor_proj,
                                scale_factor_packed);
            if (guard_band_flag[i])
                GuardBand(i);
        }
    }
}
aligned(8) class RectRegionPacking(i, scale_factor_proj,
                                    scale_factor_packed) {
    if (scale_factor_proj) {
        unsigned int(8) proj_reg_width_scaled[i];
        unsigned int(8) proj_reg_height_scaled[i];
        unsigned int(8) proj_reg_top_scaled[i];
        unsigned int(8) proj_reg_left_scaled[i];
    } else {
        unsigned int(32) proj_reg_width[i];
        unsigned int(32) proj_reg_height[i];
        unsigned int(32) proj_reg_top[i];
        unsigned int(32) proj_reg_left[i];
    }
    unsigned int(3) transform_type[i];
    bit(5) reserved = 0;
    if (scale_factor_packed) {
        unsigned int(8) packed_reg_width_scaled[i];
        unsigned int(8) packed_reg_height_scaled[i];
        unsigned int(8) packed_reg_top_scaled[i];
        unsigned int(8) packed_reg_left_scaled[i];
    } else {
        unsigned int(16) packed_reg_width[i];
        unsigned int(16) packed_reg_height[i];
        unsigned int(16) packed_reg_top[i];
        unsigned int(16) packed_reg_left[i];
    }
}
```

In one version of the current embodiment, at least one of width, height, top offset and left offset is scaled using a scale factor.

In another version of the current embodiment, the scale factor is predefined and only a flag is signaled whether the width, height, and offsets of the region should be derived by scaling or not using the predefined scale factor.

In yet another version of the current embodiment, only one scale factor is signaled for both projected and packed regions to derive the width, height, top offset and left offset.

In yet another version of the current embodiment, one scale factor is used for the horizontal direction (i.e. for width and left offset) and another scale factor for the vertical direction (i.e. height and top offset).

In yet another version of the current embodiment, the four coordinates of the rectangle are signaled as top, left, bottom, right rather than using top, left, width, height.

In yet another version of the current embodiment, the number of bits to use for coordinates are signaled rather than using 8 bits for each coordinate. The number of bits to use could be signaled once and be constant for all regions or signaled per region. Separate number of bits could be signaled and used for each coordinate type, for example that 7 bits are used for top and left, and 5 bits are used for width and height.

In yet another version of the current embodiment, the scaling of region-wise packing information is disabled if guard bands are used. This may be signaled with a flag that guard bands are not used in the picture, or a restriction could be made that guard bands may not be present if scale_factor_flag is set to 1.

In yet another version of the current embodiment, the size of the guard bands for a region are parsed before parsing the width, height, top offset and bottom offset of the region. The sizes of the guard bands are then also used to determine the width, height, top offset and bottom offset of the region. This may be useful when the region itself is not aligned with CTUs but the region together with the guard bands are.

Figures 9, 10:
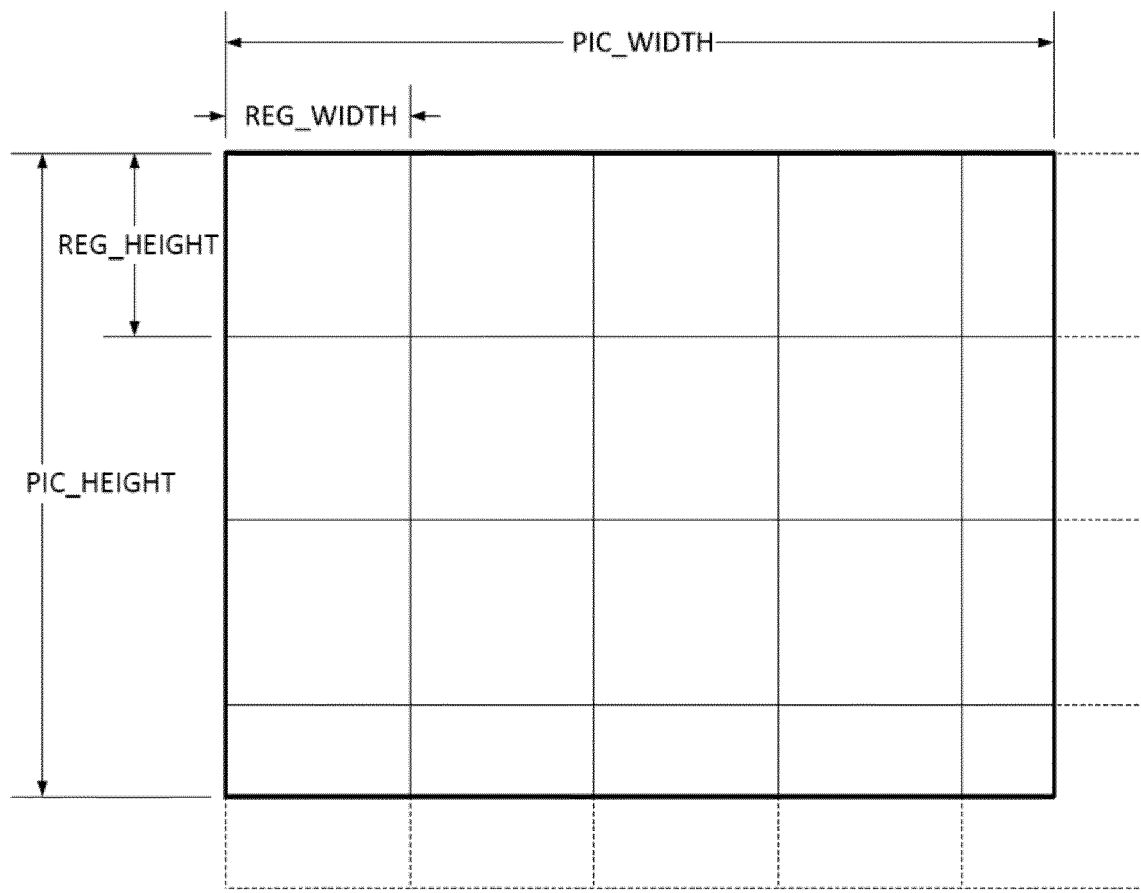
FIG. 9 illustrates an example in which each region is not aligned with the CTUs but the region together with its guard bands are aligned with the CTUs.
FIG. 10 illustrates a scenario in which a picture is divided into a non-integer number of regions.

FIG. 9 illustrates an example in which each region is not aligned with the CTUs but the region together with its guard bands are aligned with the CTUs. In FIG. 9, there are six regions, each surrounded by its own guard bands, which are labeled "GB". The CTUs are indicated with dashed lines. The width of a region may then be calculated as:

reg_width=reg_width_scaled*scale_factor-gb_width_left-gb_width_right

Similarly, the height of a region may be calculated as:

reg_height=reg_height_scaled*scale_factor-gb_height_top-gb_height_bottom

The left offset of a region may be calculated as:

reg_left_offset=reg_left_offset_scaled*scale_factor-gb_width_left and similarly, the top offset of a region may be calculated as:

reg_top_offset=reg_top_offset_scaled*scale_factor-gb_height_top

Embodiment 2—Equally Sized Regions

In a second embodiment, the observation is made that the regions in the same picture often have the same size. Moreover, the order of the regions is often in raster scan order. The solution of embodiment 2 utilizes this fact to make a more compact description of the region-wise packing information.

In a preferred version of the current embodiment two flags are signaled for each of projected picture and packed picture.

The first flag is to indicate whether all regions in the projected picture and packed picture, respectively, have the same size. If the flag is set, only the width and height of the first region of the picture is signaled. At the receiver side the width and height of the first region is parsed from the bitstream and the height and width of the other regions in the picture are copied from the first region.

The second flag is to indicate whether all regions in the projected picture and packed picture, respectively, are ordered in raster scan order. If the second flag is set, only the width and height of the first region of the picture is signaled. Since it is known that the regions are scanned in raster scan order no offsets need to be signaled. At the receiver side the width and height of the first region is parsed from the bitstream and the height and width of the other regions in the picture is copied from the first region. At the receiver side, the top offset and the left offset of the regions are derived from the region index, region height and width and the picture width.

The following example decoder steps apply for the parsing and construction of regions according to embodiment 2:
1. Parse a first flag from the bitstream indicating whether the regions in the projected picture all have equal size.
2. Parse a second flag from the bitstream indicating whether the regions in the packed picture all have equal size.
3. Parse a third flag from the bitstream indicating whether the regions in the projected picture are ordered in raster scan order.
4. Parse a fourth flag from the bitstream indicating whether the regions in the packed picture are ordered in raster scan order.
5. If the first flag is equal to 0, explicitly parse the width and height for each region in the projected picture from the bitstream.
6. If the first flag is equal to 1, parse the width and height of the first region in the projected picture from the bitstream. For the rest of the regions in the projected picture, copy the width and height from the first region to the width and height for each region.
7. If the second flag is equal to 0, explicitly parse the width and height for each region in the packed picture from the bitstream.
8. If the second flag is equal to 1, parse the width and height of the first region in the packed picture from the bitstream. For the rest of the regions in the packed picture, copy the width and height from the first region to the width and height for each region.
9. If the third flag is equal to 0, explicitly parse the top offset and left offset for each region in the projected picture from the bitstream.
10. If the third flag is equal to 1, for each region with index n in the projected picture, derive the top and left offsets according to:
    a. leftOffset[n] is set equal to the x-position of the first (x, y)-point in raster scan order of the projected picture not already occupied by a region.
    b. topOffset[n] is set equal to the y-position of the first (x, y)-point in raster scan order of the projected picture not already occupied by a region.
11. If the fourth flag is equal to 0, explicitly parse the top offset and left offset for each region in the packed picture from the bitstream.
12. If the fourth flag is equal to 1, for each region with index n in the packed picture, derive the top and left offsets according to:
    a. leftOffset[n] is set equal to the x-position of the first (x, y)-point in raster scan order of the packed picture not already occupied by a region.
    b. topOffset[n] is set equal to the y-position of the first (x, y)-point in raster scan order of the packed picture not already occupied by a region.
13. Use the reconstructed width, height, top offset and left offset of at least one packed region to decode the at least one packed regions.
14. Project the at least one decoded packed region into at least one projected region using the width, height, top offset and left offset of the at least one packed region and the at least one projected region.

In steps 10 and 12 above, if also the corresponding first or third flag that indicates whether the regions have the same size, the top and left offsets can be derived as:

$$\text{leftOffset}[n] = (n \% \text{ceil}(w_p/w_r))*w_r,$$

$$\text{topOffset}[n] = \text{floor}(n/\text{ceil}(w_p/w_r))*h_r,$$

where $w_p$ is the width of the picture, $w_r$ is the width of the first region, $h_r$ is the height of the first region, ceil(x) is a function that returns the smallest integer greater than or equal to x and floor(x) is a function that returns the greatest integer less than or equal to x.

Otherwise, the pixels of the picture could be traversed in raster scan order for each new region. When a pixel is found that does not belong to a region is encountered, the left and top offset of a new region is set to the x- and y-positions of the pixel. The pixel and all pixels in the area the new region covers are marked as belonging to a region.

The following example encoder steps apply for the construction and signaling of regions according to embodiment 2:

1. Define regions for the projected and packed pictures where each region is defined by its width, height and top and left positions.
2. Determine whether all regions in the projected picture have equal size. If so, set a first flag to 1, else set it to 0. Signal the first flag in the bitstream.
3. Determine whether all regions in the packed picture have equal size. If so set a second flag to 1, else set it to 0. Signal the second flag in the bitstream.
4. Determine whether all regions in the projected picture are ordered in raster scan order. If so set a third flag to 1, else set it to 0. Signal the third flag in the bitstream.
5. Determine whether all regions in the packed picture are ordered in raster scan order. If so set a fourth flag to 1, else set it to 0. Signal the fourth flag in the bitstream.
6. If the first flag was set to 1, signal only the width and height of the first region of the projected picture in the bitstream. If the first flag was set to 0, signal the width and height for each of the regions in the projected picture.
7. If the second flag was set to 1, signal only the width and height of the first region of the packed picture in the bitstream. If the second flag was set to 0, signal the width and height for each of the regions in the packed picture.
8. If the third flag was set to 0, signal the top offset and the left offset for each of the regions in the projected picture.
9. If the fourth flag was set to 0, signal the top offset and the left offset for each of the regions in the packed picture.
10. Project at least one projected region into at least one packed region using the width, height, top offset and left offset of the at least one packed region and the at least one projected region.
11. Use the width, height, top offset and left offset of at least one packed region to encode the at least one packed regions.

It should be obvious from a person skilled in the art that the order of information for the projected and packed pictures could be signaled in any order, e.g. packed region information before projected region information, top and left offsets before width and height, etc.

FIG. 10 illustrates a scenario in which a picture is divided into a non-integer number of regions. In FIG. 10, a picture having dimensions pic_width by pic_height is divided into regions having dimensions reg_width by reg_height. FIG. 10 shows an example of when the regions in the bottom row and right column do not fit within the picture. The dashed lines indicate how far past the right and/or bottom border of the picture a region of size reg_width by reg_height would extend. The solution is to resize these regions to fit within the picture. In one version of the current embodiment, the size of that region is adjusted such that it fits within the picture according to the following algorithm:

if reg_width[0]>pic_width-reg_left_offset[i]:

reg_width[i]=pic_width-reg_left_offset[i]

else:

reg_width[i]=reg_width[0]

if reg_height[0]>pic_height-reg_top_offset[i]

reg_height[i]=pic_height-reg_top_offset[i]

else:

reg_height[i]=reg_height[0]

where reg_width[x] and reg_height[x] are the width and height of the region with index x, reg_left_offset[x] and reg_top_offset[x] is the left and top offsets of the region with index x, and i is the index of the current region.

The following is an example of how the syntax tables from the current OMAF version 2 working draft (m42923v1) could be modified to support embodiment 2, with changes highlighted using bold font. An example of the full specification text of m42923v1, modified to support embodiment 2, can be found in appendix B.

Syntax for embodiment 2, version 1

```
aligned(8) class RegionWisePackingStruct( ) {
  unsigned int(1) constituent_picture_matching_flag;
  unsigned int(1) proj_reg_equal_size_flag;
  unsigned int(1) packed_reg_equal_size_flag;
  unsigned int(1) proj_raster_scan_order_flag;
  unsigned int(1) packed_raster_scan_order_flag;
  bit(7) reserved = 0;
  bit(3) reserved = 0;
  unsigned int(8) num_regions;
  unsigned int(32) proj_picture_width;
  unsigned int(32) proj_picture_height;
  unsigned int(16) packed_picture_width;
  unsigned int(16) packed_picture_height;
  for (i = 0; i < num_regions; i++) {
    bit(3) reserved = 0;
    unsigned int(1) guard_band_flag[i];
    unsigned int(4) packing_type[i];
    if (packing_type[i] == 0) {
      RectRegionPacking(i,
          proj_reg_equal_size_flag,
          packed_reg_equal_size_flag,
          proj_raster_scan_order_flag,
          packed_raster_scan_order_flag);
      if (guard_band_flag[i])
        GuardBand(i);
    }
  }
}
aligned(8) class RectRegionPacking(i,
      proj_reg_equal_size_flag,
      packed_reg_equal_size_flag,
      proj_raster_scan_order_flag,
      packed_raster_scan_order_flag) {
  if (proj_reg_equal_size_flag) {
    if (i == 0) {
      unsigned int(32) proj_reg_width[0];
      unsigned int(32) proj_reg_height[0];
    }
  } else {
    unsigned int(32) proj_reg_width[i];
    unsigned int(32) proj_reg_height[i];
  }
  if (!proj_raster_scan_order_flag) {
    unsigned int(32) proj_reg_top[i];
    unsigned int(32) proj_reg_left[i];
  }
  unsigned int(3) transform_type[i];
  bit(5) reserved = 0;
  if (packed_reg_equal_size_flag) {
    if (i == 0) {
      unsigned int(16) packed_reg_width[0];
      unsigned int(16) packed_reg_height[0];
    }
  } else {
    unsigned int(16) packed_reg_width[i];
    unsigned int(16) packed_reg_height[i];
  }
```

Syntax for embodiment 2, version 1

```
if (!packed_raster_scan_order_flag) {
   unsigned int(16) packed_reg_top[i];
   unsigned int(16) packed_reg_left[i];
   }
}
```

In one version of the embodiment not all of the four flags are present in the syntax. Instead only, at least one of the four flag is present, e.g. proj_reg_equal_size_flag and packed_reg_equal_size_flag.

In another version of the current embodiment only one flag is signaled for both of projected and packed regions. It is thus only possible to either copy the sizes and/or build raster scan order for both of projected and packed pictures at the same time or don't copy and build raster can order at all.

In yet another version of the current embodiment a combined flag is signaled for the size copy and the raster scan offset reconstruction, i.e. the flag is used to indicate whether the height and width of all the regions are equal and can be copied from the first region and are ordered in raster scan order and the top and left offsets can be derived without further signaling.

In yet another version of the current embodiment the size copy and/or raster scan offset reconstruction of region-wise packing information is disabled if guard bands are used. This may be signaled with a flag that guard bands are not used in the picture, or a restriction could be made that guard bands may not be present if for instance packed_reg_equal_size_flag or packed_raster_scan_order_flag is set to 1.

In yet another version of the current embodiment the size of the guard bands for a region are parsed before parsing the width, height, top offset and bottom offset of the region. The sizes of the guard bands are then also used to determine the width, height, top offset and bottom offset of the region. This may be useful when calculating the offsets for the regions. This approach may be used in the scenario shown in FIG. 9, for example. In this approach, the width and height of each region are copied from the first region as before. The left offset of a region may be calculated by summing up the region widths and left and right guard bands of the previously parsed regions of the current row and adding the left guard band of the current region. Similarly, the top offset of a region may be calculated by summing up the region heights and top and bottom guard bands of the previously parsed regions of the current column and adding the top guard band of the current region.

In yet another version of the current embodiment the most common region size (or region sizes) is defined outside the loop in the RegionWisePackingStruct. A flag (or index if more than one region size) is then used inside the loop to indicate whether the current region size should be copied from the common region size (or region sizes) or be explicitly signaled. This is useful if many, but not all, regions have equal size.

The following is an example of how the syntax tables and semantics from the current OMAF version 2 working draft (m42923v1) would be modified to support this version of embodiment 2, with changes highlighted using bold font.

Syntax for embodiment 2, version 2

```
aligned(8) class RegionwisePackingStruct( ) {
   unsigned int(1) constituent_picture_matching_flag;
   unsigned int(1) common_region_packing_information_flag;
   bit(7) reserved = 0;
   bit(6) reserved = 0;
   unsigned int(8) num_regions;
   unsigned int(32) proj_picture_width;
   unsigned int(32) proj_picture_height;
   unsigned int(16) packed_picture_width;
   unsigned int(16) packed_picture_height;
   if common_region_packing_information_flag {
                    CommonRectRegionPacking( )
   }
   for (i = 0; i < num_regions; i++) {
      bit(3) reserved = 0;
      unsigned int(1) guard_band_flag[i];
      unsigned int(4) packing_type[i];
      if (packing_type[i] == 0) {
         RectRegionPacking(i);
         if (guard_band_flag[i])
            GuardBand(i);
      }
   }
}
aligned(8) class CommonRectRegionPacking( ) {
   unsigned int(1) common_proj_reg_flag;
   unsigned int(1) common packed_reg_flag;
   bit(6) reserved = 0;
   if (common_proj_reg_flag) {
      unsigned int(32) common_proj_reg_width;
      unsigned int(32) common_proj_reg_height;
   }
   if (common_packed_reg_flag) {
      unsigned int(16) common_packed_reg_width;
      unsigned int(16) common_packed_reg_height;
   }
}
aligned(8) class RectRegionPacking(i) {
   unsigned int(3) transform_type[i];
   unsigned int(1) copy_proj_from_common_flag;
   unsigned int(1) copy_packed_from_common_flag;
   bit(3) reserved = 0;
   if (copy_proj_from_common_flag) {
      unsigned int(32) proj_reg_width[i];
      unsigned int(32) proj_reg_height[i];
   }
   unsigned int(32) proj_reg_top[i];
   unsigned int(32) proj_reg_left[i];
   unsigned int(3) transform_type[i];
   bit(5) reserved = 0;
   if (copy _packed_from common_flag) {
      unsigned int(16) packed_reg_width[i];
      unsigned int(16) packed_reg_height[i];
   }
   unsigned int(16) packed_reg_top[i];
   unsigned int(16) packed_reg_left[i];
}
```

Semantics for Embodiment 2, Version 2 common_region_packing_information_flag equal to 1 specifies that common packing information is used for the regions. common_region_packing_information_flag equal to 0 specifies that common packing information is not used for the regions.

common_proj_reg_flag equal to 1 specifies that a common width and height is defined for the projected regions. common_proj_reg_flag equal to 0 specifies that a common width and height is not defined for the projected regions.

common packed_reg_flag equal to 1 specifies that a common width and height is defined for the packed regions. common_packed_reg_flag equal to 0 specifies that a common width and height is not defined for the packed regions.

common_proj_reg_width, common_proj_reg_height, common_packed_reg_width and common_packed_reg_height specifies the common width and height for the projected and packed regions.

copy_proj_from_common_flag equal to 1 specifies that the width and height of the current projected region are copied from common_proj_reg_width and common_proj_reg_height. copy_proj_from_common_flag equal to 0 specifies that the width and height of the current projected region are read from the bitstream.

copy_packed_from_common_flag equal to 1 specifies that the width and height of the current packed region are copied from common_packed_reg_width and common_packed_reg_height. copy_packed_from_common_flag equal to 0 specifies that the width and height of the current packed region are read from the bitstream.

Embodiment 3—Packing of Guard Bands

In a third embodiment the observation is made that guard bands typically have the same size for all regions of a picture, if they are applied.

In the preferred version of this embodiment a common_guard_band_size_flag is first signaled whether all guard bands should use a common guard band size or not. If it is set to 1, a common guard band size is signaled. If the guard_band_flag is set that at least one guard band is used for a region, four flags are signaled whether the common guard band should be applied to the left, right, top and/or bottom of the current region. If the common_guard_band_size_flag is set to 0, the guard bands are set explicitly.

The following is an example of how the syntax tables and semantics from the current OMAF version 2 working draft (m42923v1) could be modified to support embodiment 3, with changes highlighted using bold font.

| Syntax for embodiment 3 |
| --- |
| aligned(8) class RegionWisePackingStruct( ) { <br>  unsigned int(1) constituent_picture_matching_flag; <br>  unsigned int(1) common_guard_band_size_flag; <br>  ~~bit(7) reserved = 0;~~ <br>  bit(6) reserved = 0; <br>  unsigned int(8) num_regions; <br>  unsigned int(32) proj_picture_width; <br>  unsigned int(32) proj_picture_height; <br>  unsigned int(16) packed_picture_width; <br>  unsigned int(16) packed_picture_height; <br>  if (common_guard_band_size_flag) { <br>    unsigned int(8) guard_band_size; <br>  } <br>  for (i = 0; i < num_regions; i++) { <br>    bit(3) reserved = 0; <br>    unsigned int(1) guard_band_flag[i]; <br>    unsigned int(4) packing_type[i]; <br>    if (packing_type[i] == 0) { <br>      RectRegionPacking(i); <br>      if (guard_band_flag[i]) <br>        GuardBand(i, common_guard_band_size_flag, guard_band_size); <br>    } <br>  } <br>} <br>aligned(8) class GuardBand(i, common_guard_band_size_flag, guard_band_size) { <br>  unsigned int(4) guard_band_used; <br>  bit(4) reserved = 0; <br>  if (use_common_guard_band_flag) { <br>    left_gb_width[i]= (guard_band_used & 0x0001) ? guard_band_size: 0; <br>    right_gb_width[i]= (guard_band_used & 0x0010) ? guard_band_size: 0; <br>    top_gb_height[i]= (guard_band_used & 0x0100) ? guard_band_size: 0; <br>    bottom_gb_height[i]= (guard_band_used & 0x1000) ? guard_band_size: 0; |

| Syntax for embodiment 3 |
| --- |
|   } else { <br>    unsigned int(8) left_gb_width[i]; <br>    unsigned int(8) right_gb_width[i]; <br>    unsigned int(8) top_gb_height[i]; <br>    unsigned int(8) bottom_gb_height[i]; <br>  } <br>  unsigned int(1) gb_not_used_for_pred_flag[i]; <br>  for (j = 0; j < 4; j++) <br>    unsigned int(3) gb_type[i][j]; <br>  bit(3) reserved = 0; <br>} |

Semantics for Embodiment 3 common_guard_band_size_flag equal to 1 specifies that a common guard band size will be used for all present guard bands in the packed picture. The size of a guard band is specified as the guard band width for the left and right guard bands and guard band height for the top and bottom guard bands. common_guard_band_size_flag equal to 0 specifies that guard bands may have different sizes in the packed picture.

guard_band_size specifies the size of the common guard band in units of pixels.

guard_band_used specifies which guard bands that are used for the current region. The first bit in guard_band_used specifies whether the left guard band is used. The second bit in guard_band_used specifies whether the right guard band is used. The third bit in guard_band_used specifies whether the top guard band is used. The fourth bit in guard_band_used specifies whether the bottom guard band is used.

Figure 13:
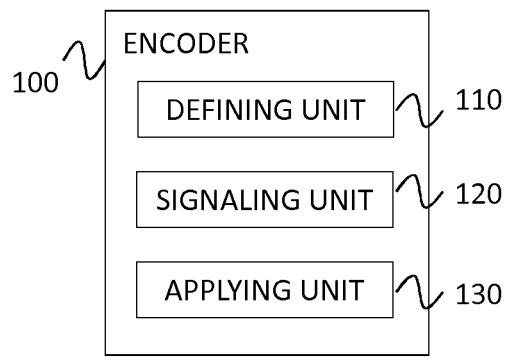
FIG. 13 depicts a schematic block diagram illustrating functional units of a video encoder for signaling region information in a bitstream for region-wise unpacking of regions from a packed picture to a projected picture according to embodiments of the present invention.

FIG. 13 is a schematic block diagram of an encoder 100, for signaling region information in a bitstream for region-wise unpacking of regions from a packed picture to a projected picture. The encoder comprises a defining unit 110, configured to define a scale factor that is common for all regions of a picture. The encoder comprises a signalling unit 120 configured to signal the scale factor in the bitstream. The encoder comprises an applying unit 130 configured to, for each of at least one region of a picture, apply the scale factor to each item of region information for the region to produce a set of scaled values. The signalling unit 120 is also configured to signal the scaled values in the bitstream.

The defining 110, signalling 120 and applying 130 units may be hardware based, software based (in this case they are called encoding and sending modules respectively) or may be a combination of hardware and software.

The applying unit 130 may apply the scale factor to each item of the region information for the region by performing a process that includes dividing the value of each item of region information by the scale factor. Here the region information may comprise region width, region height, top offset of region in picture, left offset of region in picture, transform type and/or guard band information. The region information may be for at least one of projected regions and packed regions.

The encoder may further comprise an including unit 140 configured to include in the bitstream a scaling flag to signal whether or not the region information should be scaled. The including unit may further include in the bitstream a sizing flag to signal whether or not all regions in the picture have the same size. Further on, if the sizing flag is set to a first value, only the size of the first region of the picture may be signaled, and if the sizing flag is set to a second value, the sizes of all regions in the picture may be explicitly signaled.

The including unit 140 may further include in the bitstream a common size flag to signal whether or not some regions in the picture have a common size. If the common size flag is set to a first value, the common size may be signaled in the bitstream and for each region a use common size flag may be included in the bitstream to signal whether the size of the region should be copied from the common size or whether the size of the region is explicitly signaled in the bitstream.

The including unit 140 may further include in the bitstream a raster flag to signal whether or not all regions in the picture are ordered according to raster scan order.

The video encoder 100 can be implemented in hardware, in software or a combination of hardware and software. The video encoder 100 can be implemented in user equipment, such as a mobile telephone, tablet, desktop, netbook, multimedia player, video streaming server, set-top box or computer. The video encoder 100 may also be implemented in a network device in the form of or connected to a network node, such as radio base station, in a communication network or system.

Although the respective units disclosed in conjunction with FIG. 13 have been disclosed as physically separate units in the device, where all may be special purpose circuits, such as ASICs (Application Specific Integrated Circuits), alternative embodiments of the device are possible where some or all of the units are implemented as computer program modules running on a general purpose processor. Such an embodiment is disclosed in FIG. 14.

Figure 14:
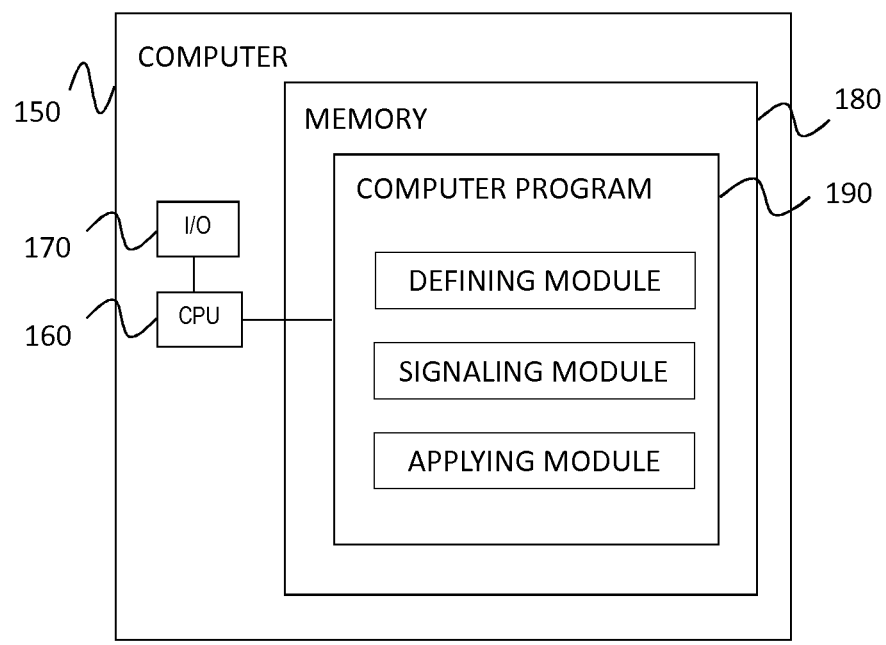
FIG. 14 illustrates a schematic block diagram illustrating a computer comprising a computer program product with a computer program for signaling region information in a bitstream for region-wise unpacking of regions from a packed picture to a projected picture, according to embodiments of the present invention.

FIG. 14 schematically illustrates an embodiment of a computer 150 having a processing unit 160 such as a DSP (Digital Signal Processor) or CPU (Central Processing Unit). The processing unit 160 can be a single unit or a plurality of units for performing different steps of the method described herein. The computer also comprises an input/output (I/O) unit 170 for receiving a video sequence. The I/O unit 170 has been illustrated as a single unit in FIG. 14 but can likewise be in the form of a separate input unit and a separate output unit.

Furthermore, the computer 150 comprises at least one computer program product 180 in the form of a non-volatile memory, for instance an EEPROM (Electrically Erasable Programmable Read-Only Memory), a flash memory or a disk drive. The computer program product 180 comprises a computer program 190, which comprises code means which, when run on the computer 150, such as by the processing unit 160, causes the computer 150 to perform the steps of the method described in the foregoing in connection with FIG. 11.

Figure 15:
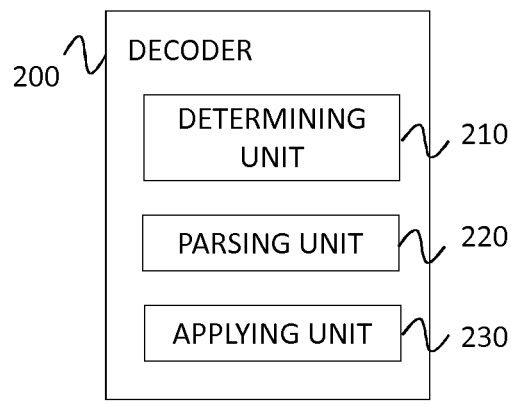
FIG. 15 depicts a schematic block diagram illustrating functional units of a video decoder, for parsing region information from a bitstream for region-wise unpacking of regions from a packed picture to a projected picture, according to embodiments of the present invention.

FIG. 15 is a schematic block diagram of a decoder 200 for parsing region information from a bitstream for region-wise unpacking of regions from a packed picture to a projected picture. The decoder comprises a determining unit 210 configured to determine that a scale factor should be used. The decoder comprises a parsing unit 220 configured to, upon a determination that a scale factor should be used, parse the bitstream to determine a scale factor and, for each of at least one region of a picture and for each item in the region information for the region, parse the bitstream to determine a scaled value for the item. The decoder comprises an applying unit 230 configured to apply the scale factor to the scaled value to produce an unscaled value for the item in the region information.

The applying unit 230 apply the scale factor to each item of region information for the region by performing a process that includes multiplying the scaled value of each item of region information by the scale factor. The region information may comprise region width, region height, top offset of region in picture, left offset of region in picture, transform type and/or guard band information. The region information may be for at least one of projected regions and packed regions.

The determining unit 210 may determine that a scale factor should be used by performing a process that includes parsing from the bitstream a scaling flag that signals whether the region information should be scaled.

The decoder 200 may be further configured to, for the determining unit 210, to determine whether or not all regions in the picture have the same size. The parsing unit 220 may, upon a determination that all regions in the picture have the same size, parse only the size of the first region of the picture. The parsing unit 220 may, upon a determination that not all regions in the picture have the same size, parse the sizes of all regions in the picture.

The decoder 200 may further determine whether or not all regions in the picture have the same size by performing a process that includes parsing the bitstream for a sizing flag that signals whether or not all regions in the picture have the same size.

According to another embodiment, the decoder may be further configured to determine whether or not some regions in the picture have a common size and, upon a determination that some regions in the picture have a common size, for each region determine whether the region is the common size. Upon a determination that the region is the common size, the decoder may be further configured to use the common size as the size for that region and, upon a determination that the region is not the common size, parse the bitstream for the size for that region. Upon a determination that some regions in the picture do not have a common size, the decoder may be further configured to, for each region, parse the bitstream for the size of that region. The decoder may further be configured to determine whether or not some regions in the picture have a common size by performing a process that includes parsing the bitstream for a common size flag and determining whether or not some regions in the picture have the common size based on the value of the common size flag. The decoder may be further operable to determine whether a region is the common size by performing a process that includes, for each region, parsing the bitstream for a flag that signals whether or not the region is the common size.

The decoder may be further operable to determine whether or not all regions in the picture are ordered according to a raster scan order. Upon a determination that all regions in the picture are ordered according to a raster scan order, the decoder may parse only the size of the first region of the picture and using the size of the first region to calculate X and Y offsets for the region. Upon a determination that not all regions in the picture are ordered according to a raster scan order, the decoder may parse the sizes of all regions in the picture and using the size of each region to calculate X and Y offsets for the region. The decoder may be further configured to determine whether or not all regions in the picture are ordered according to a raster scan by performing a process that includes parsing the bitstream for a raster order flag that signals whether or not all regions in the picture are ordered according to a raster scan order.

Although the respective units disclosed in conjunction with FIG. 15 have been disclosed as physically separate units in the device, where all may be special purpose circuits, such as ASICs (Application Specific Integrated Circuits), alternative embodiments of the device are possible where some or all of the units are implemented as computer program modules running on a general purpose processor. Such an embodiment is disclosed in FIG. 16.

Figure 16:
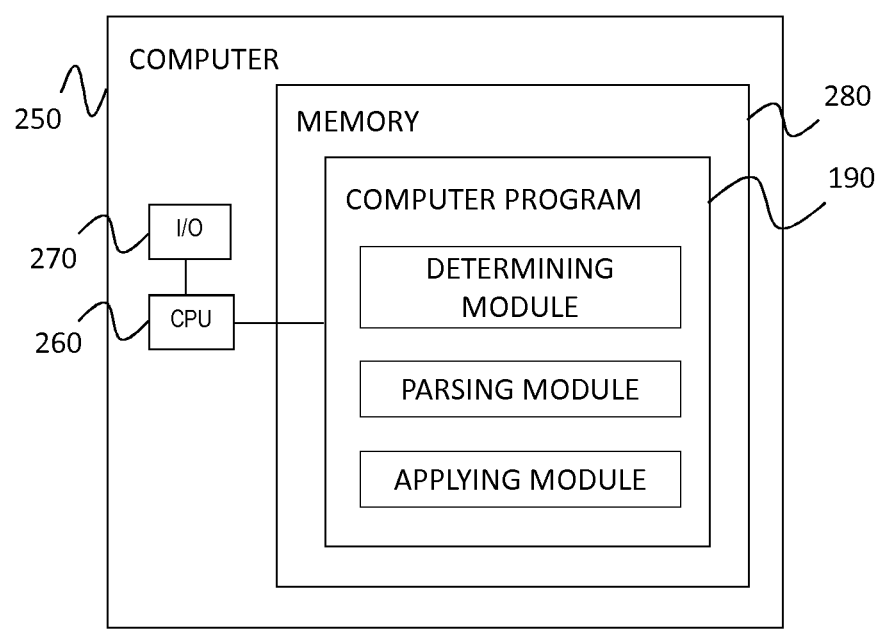
FIG. 16 illustrates a schematic block diagram illustrating a computer comprising a computer program product with a computer program for parsing region information from a bitstream for region-wise unpacking of regions from a packed picture to a projected picture, according to embodiments of the present invention.

FIG. 16 schematically illustrates an embodiment of a computer 250 having a processing unit 260 such as a DSP (Digital Signal Processor) or CPU (Central Processing Unit). The processing unit 260 can be a single unit or a plurality of units for performing different steps of the method described herein. The computer also comprises an input/output (I/O) unit 270 for receiving a video sequence. The I/O unit 270 has been illustrated as a single unit in FIG. 16 but can likewise be in the form of a separate input unit and a separate output unit.

Furthermore, the computer 250 comprises at least one computer program product 280 in the form of a non-volatile memory, for instance an EEPROM (Electrically Erasable Programmable Read-Only Memory), a flash memory or a disk drive. The computer program product 280 comprises a computer program 290, which comprises code means which, when run on the computer 250, such as by the processing unit 260, causes the computer 250 to perform the steps of the method described in the foregoing in connection with FIG. 12.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible.

APPENDIX A—PROPOSED SPECIFICATION TEXT FOR EMBODIMENT 1

The following is an example of how the full specification text of the current OMAF working draft (m42923v1) could be modified to support embodiment 1, with changes to the current specification highlighted using bold font.

7.5.3 Region-wise packing structure 7.5.3.1 Definition

RegionWisePackingStruct specifies the mapping between packed regions and the respective projected regions and specifies the location and size of the guard bands, if any.

NOTE: Among other information the RegionWisePackingStruct also provides the content coverage information in the 2D Cartesian picture domain.

A decoded picture in the semantics of this clause is either one of the following depending on the container for this syntax structure:

For video, the decoded picture is the decoding output resulting from a sample of the video track.

For an image item, the decoded picture is a reconstructed image of the image item.

The content of RegionWisePackingStruct is informatively summarized below, while the normative semantics follow subsequently in this clause:

The width and height of the projected picture are explicitly signalled with proj_picture_width and proj_picture_height, respectively.

The width and height of the packed picture are explicitly signalled with packed_picture_width and packed_picture_height, respectively.

When the projected picture is stereoscopic and has the top-bottom or side-by-side frame packing arrangement, constituent_picture_matching_flag equal to 1 specifies that the projected region information, packed region information, and guard band region information in this syntax structure apply individually to each constituent picture, the packed picture and the projected picture have the same stereoscopic frame packing format, and the number of projected regions and packed regions is double of that indicated by the value of num_regions in the syntax structure.

RegionWisePackingStruct contains a loop, in which a loop entry corresponds to the respective projected regions and packed regions in both constituent pictures (when constituent_picture_matching_flag equal to 1) or to a projected region and the respective packed region (when constituent_picture_matching_flag equal to 0), and the loop entry the contains the following:

a flag indicating the presence of guard bands for the packed region, the packing type (however, only rectangular region-wise packing is specified in this document), the mapping between a projected region and the respective packed region in the rectangular region packing structure RectRegionPacking(i, scale_factor_proj, scale_factor_packed), when guard bands are present, the guard band structure for the packed region GuardBand(i).

The content of the rectangular region packing structure RectRegionPacking(i, scale_factor_proj, scale_factor_packed) is informatively summarized below, while the normative semantics follow subsequently in this clause:

If scale_factor_proj is set, then proj_reg_width_scaled[i]*scale_factor_proj, proj_reg_height_scaled[i]*scale_factor_proj, proj_reg_top_scaled[i]*scale_factor_proj, and proj_reg_left_scaled[i]*scale_factor_proj specify the width, height, top offset, and left offset, respectively, of the i-th projected region. Otherwise, proj_reg_width[i], proj_reg_height[i], proj_reg_top[i], and proj_reg_left[i] specify the width, height, top offset, and left offset, respectively, of the i-th projected region.

transform_type[i] specifies the rotation and mirroring, if any, that are applied to the i-th packed region to remap it to the i-th projected region.

If scale_factor_packed is set, then packed_reg_width_scaled[i]*scale_factor_packed, packed_reg_height_scaled[i]*scale_factor_packed, packed_reg_top_scaled[i]*scale_factor_packed, and packed_reg_left_scaled[i]*scale_factor_packed specify the width, height, top offset, and left offset, respectively, of the i-th packed region. Otherwise, packed_reg_width[i], packed_reg_height[i], packed_reg_top[i], and packed_reg_left[i] specify the width, height, the top offset, and the left offset, respectively, of the i-th packed region.

The content of the guard band structure GuardBand(i) is informatively summarized below, while the normative semantics follow subsequently in this clause:

left_gb_width[i], right_gb_width[i], top_gb_height[i], or bottom_gb_height[i] specify the guard band size on the left side of, the right side of, above, or below, respectively, the i-th packed region.

gb_not_used_for_pred_flag[i] indicates if the encoding was constrained in a manner that guards bands are not used as a reference in the inter prediction process.

gb_type[i][j] specifies the type of the guard bands for the i-th packed region.

Figure 2:
FIG. 2 shows an example of an equirectangular projection format, according to the prior art.
Figure 3:
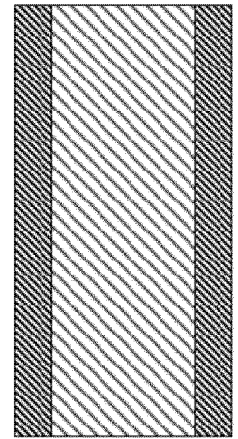
FIG. 3 shows an example of a picture before packing (left) and after packing (right).
Figure 1:
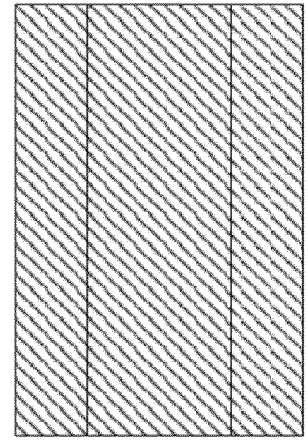
FIG. 1 illustrates an example of a typical cube map, as known in the prior art.
Figure 6:
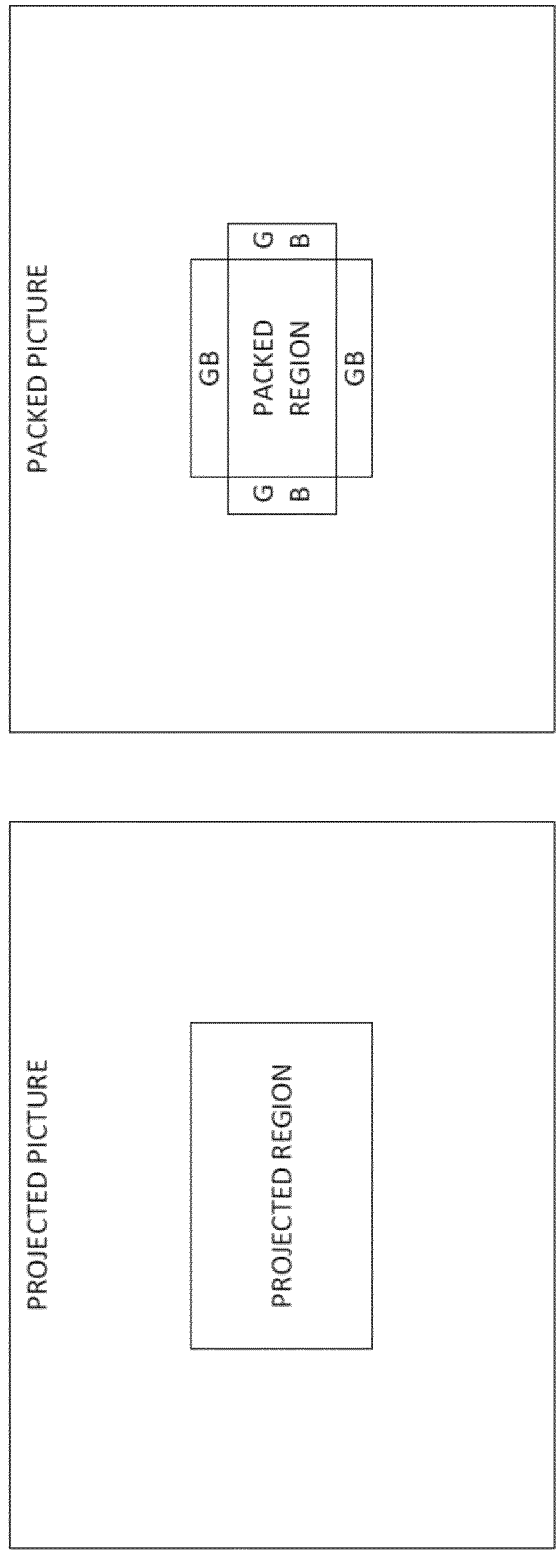
FIG. 6 illustrates an example of a projected picture with a projected region (left) and its corresponding packed region in a packed picture with guard bands around it (right).

FIG. 7-2 illustrates an example of the position and size of a projected region within a projected picture (on the left side) as well as that of a packed region within a packed picture with guard bands (on the right side). This example applies when the value of constituent_picture_matching_flag is equal to 0.

. . .

This clause is organized as follows:
  The syntax and semantics of the rectangular region packing structure are specified in clauses 0 and 0, respectively.
  The syntax and semantics of the guard band structure are specified in clauses 0 and 0, respectively.
  The syntax and semantics of the region-wise packing structure are specified in clauses 0 and 0, respectively.
  Clause 0 derives variables from syntax element values of the rectangular region packing, guard band, region-wise packing structures. Clause 0 also uses the variables to specify constraints for the syntax element values. The variables are also used in other clauses.

7.5.3.2 Syntax of the rectangular region packing structure

```
aligned(8) class RectRegionPacking(i, scale_factor_proj, scale_factor_packed) {
    if (scale_factor_proj) {
        unsigned int(8) proj_reg_width_scaled[i];
        unsigned int(8) proj_reg_height_scaled[i];
        unsigned int(8) proj_reg_top_scaled[i];
        unsigned int(8) proj_reg_left_scaled[i];
    } else {
        unsigned int(32) proj_reg_width[i];
        unsigned int(32) proj_reg_height[i];
        unsigned int(32) proj_reg_top[i];
        unsigned int(32) proj_reg_left[i];
    }
    unsigned int(3) transform_type[i];
    bit(5) reserved=0;
    if (scale_factor_packed) {
        unsigned int(8) packed_reg_width_scaled[i];
        unsigned int(8) packed_reg_height_scaled[i];
        unsigned int(8) packed_reg_top_scaled[i];
        unsigned int(8) packed_reg_left_scaled[i];
    } else {
        unsigned int(16) packed_reg_width[i];
        unsigned int(16) packed_reg_height[i];
        unsigned int(16) packed_reg_top[i];
        unsigned int(16) packed_reg_left[i];
    }
}
```

7.5.3.3 Semantics of the rectangular region packing structure
  proj_reg_width[i], proj_reg_height[i], proj_reg_top[i], and proj_reg_left[i] specify the width, height, top offset, and left offset, respectively, of the i-th projected region, either within the projected picture (when constituent_picture_matching_flag is equal to 0) or within the constituent picture of the projected picture (when constituent_picture_matching_flag is equal to 1).
  proj_reg_width[i], proj_reg_height[i], proj_reg_top[i] and proj_reg_left[i] are indicated in relative projected picture sample units.

NOTE 1: Two projected regions may partially or entirely overlap with each other. When there is an indication of quality difference, e.g., by a region-wise quality ranking indication, then for the overlapping area of any two overlapping projected regions, the packed region corresponding to the projected region that is indicated to have higher quality should be used for rendering.

proj_reg_width_scaled[i], proj_reg_height_scaled[i], proj_reg_top_scaled[i], and proj_reg_left_scaled[i] multiplied by scale_factor_proj specify the scaled width, height, top offset, and left offset, respectively, of the i-th projected region, either within the projected picture (when constituent_picture_matching_flag is equal to 0) or within the constituent picture of the projected picture (when constituent_picture_matching_flag is equal to 1). proj_reg_width[i], proj_reg_height[i], proj_reg_top[i] and proj_reg_left[i] multiplied by scale_factor_proj are indicated in relative projected picture sample units.

transform_type[i] specifies the rotation and mirroring that is applied to the i-th packed region to remap it to the i-th projected region. When transform_type[i] specifies both rotation and mirroring, rotation is applied before mirroring for converting sample locations of a packed region to sample locations of a projected region. The following values are specified:
  0: no transform
  1: mirroring horizontally
  2: rotation by 180 degrees (counter-clockwise)
  3: rotation by 180 degrees (counter-clockwise) before mirroring horizontally
  4: rotation by 90 degrees (counter-clockwise) before mirroring horizontally
  5: rotation by 90 degrees (counter-clockwise)
  6: rotation by 270 degrees (counter-clockwise) before mirroring horizontally
  7: rotation by 270 degrees (counter-clockwise)
    NOTE 2: Clause 5.4.2 specifies the semantics of transform_type[i] for converting a sample location of a packed region in a packed picture to a sample location of a projected region in a projected picture.

packed_reg_width[i], packed_reg_height[i], packed_reg_top[i], and packed_reg_left[i] specify the width, height, the offset, and the left offset, respectively, of the i-th packed region, either within the packed picture (when constituent_picture_matching_flag is equal to 0) or within each constituent picture of the packed picture (when constituent_picture_matching_flag is equal to 1). packed_reg_width[i], packed_reg_height[i], packed_reg_top[i], and packed_reg_left[i] are indicated in relative packed picture sample units. packed_reg_width[i], packed_reg_height[i], packed_reg_top[i], and packed_reg_left[i] shall represent integer horizontal and vertical coordinates of luma sample units within the decoded pictures.
  NOTE 3: Two packed regions may partially or entirely overlap with each other.

packed_reg_width_scaled[i], packed_reg_height_scaled[i], packed_reg_top_scaled[i], and packed_reg_left_scaled[i] multiplied by scale_factor_packed specify the width, height, offset, and left offset, respectively, of the i-th packed region, either within the packed picture (when constituent_picture_matching_flag is equal to 0) or within each constituent picture of the packed picture (when constituent_picture_matching_flag is equal to 1). packed_reg_width_scaled[i], packed_reg_height_scaled[i], packed_reg_top_scaled[i], and packed_reg_left_scaled[i] multiplied by scale_factor_packed are indicated in relative packed picture sample units. packed_reg_width_scaled[i], packed_reg_height_scaled[i], packed_reg_top_scaled[i], and packed_reg_left_scaled[i] multiplied by scale_factor_packed shall represent integer horizontal and vertical coordinates of luma sample units within the decoded pictures.

7.5.3.4 Syntax of the guard band structure aligned(8) class GuardBand(i) {
  unsigned int(8) left_gb_width[i];
  unsigned int(8) right_gb_width[i];
  unsigned int(8) top_gb_height[i];
  unsigned int(8) bottom_gb_height[i];
  unsigned int(1) gb_not_used_for_pred_flag[i];
  for (j=0; j<4; j++) unsigned int(3) gb_type[i][j];
  bit(3) reserved=0;
}

7.5.3.5 Semantics of the guard band structure left_gb_width[i] specifies the width of the guard band on the left side of the i-th packed region in relative packed picture sample units. When the decoded picture has 4:2:0 or 4:2:2 chroma format, left_gb_width[i] shall correspond to an even number of luma samples within the decoded picture.

right_gb_width[i] specifies the width of the guard band on the right side of the i-th packed region in relative packed picture sample units. When the decoded picture has 4:2:0 or 4:2:2 chroma format, right_gb_width[i] shall correspond to an even number of luma samples within the decoded picture.

top_gb_height[i] specifies the height of the guard band above the i-th packed region in relative packed picture sample units. When the decoded picture has 4:2:0 chroma format, top_gb_height[i] shall correspond to an even number of luma samples within the decoded picture.

bottom_gb_height[i] specifies the height of the guard band below the i-th packed region in relative packed picture sample units. When the decoded picture has 4:2:0 chroma format, bottom_gb_height[i] shall correspond to an even number of luma samples within the decoded picture.

When GuardBand(i) is present, at least one of left_gb_width[i], right_gb_width[i], top_gb_height[i], or bottom_gb_height[i] shall be greater than 0.

gb_not_used_for_pred_flag[i] equal to 0 specifies that the guard bands may or may not be used in the inter prediction process. gb_not_used_for_pred_flag[i] equal to 1 specifies that the sample values of the guard bands are not used in the inter prediction process.

NOTE 1: When gb_not_used_for_pred_flag[i] is equal to 1, the sample values within guard bands in decoded pictures could be rewritten even if the decoded pictures were used as references for inter prediction of subsequent pictures to be decoded. For example, the content of a packed region could be seamlessly expanded to its guard band with decoded and re-projected samples of another packed region.

gb_type[i][j] specifies the type of the guard bands for the i-th packed region as follows, with j equal to 0, 1, 2, or 3 indicating that the semantics below apply to the left, right, top, or bottom edge, respectively, of the packed region:

gb_type[i][j] equal to 0 specifies that the content of the guard bands in relation to the content of the packed regions is unspecified. When gb_not_used_for_pred_flag[i] is equal to 0, gb_type[i][j] shall not be equal to 0.

gb_type[i][j] equal to 1 specifies that the content of the guard bands suffices for interpolation of sub-pixel values within the packed region and less than one pixel outside of the boundary of the packed region.

NOTE 2: gb_type[i][j] equal to 1 could be used when the boundary samples of a packed region have been copied horizontally or vertically to the guard band.

gb_type[i][j] equal to 2 specifies that the content of the guard bands represents actual picture content that is spherically adjacent to the content in the packed region and is on the surface of the packed region at quality that gradually changes from the picture quality of the packed region to that of the spherically adjacent packed region.

gb_type[i][j] equal to 3 specifies that the content of the guard bands represents actual picture content that is spherically adjacent to the content in the packed region and is on the surface of the packed region at the picture quality of the packed region.

gb_type[i][j] values greater than 3 are reserved.

---

7.5.3.6 Syntax the region-wise packing structure aligned(8) class RegionWisePackingStruct( ) {
  unsigned int(1) constituent_picture_matching_flag;
  unsigned int(1) scale_factor_flag;
  ~~bit(7) reserved = 0;~~
  bit(6) reserved = 0;
  if (scale_factor_flag) {
    unsigned int(16) scale_factor_proj;
    unsigned int(16) scale_factor_packed;
  }
  unsigned int(8) num_regions;
  unsigned int(32) proj_picture_width;
  unsigned int(32) proj_picture_height;
  unsigned int(16) packed_picture_width;
  unsigned int(16) packed_picture_height;
  for (i = 0; i < num_regions; i++) {
    bit(3) reserved = 0;
    unsigned int(1) guard_band_flag[i];
    unsigned int(4) packing_type[i];
    if (packing_type[i] == 0) {
      RectRegionPacking(i, scale_factor_proj, scale_factor_packed);
      if (guard_band_flag[i])
        GuardBand(i);
    }
  }
}

---

7.5.3.7 Semantics of the region-wise packing structure constituent_picture_matching_flag equal to 1 specifies that the projected region information, packed region information, and guard band region information in this syntax structure apply individually to each constituent picture and that the packed picture and the projected picture have the same stereoscopic frame packing format. constituent_picture_matching_flag equal to 0 specifies that the projected region information, packed region information, and guard band region information in this syntax structure apply to the projected picture. When SpatiallyPackedStereoFlag is equal to 0, constituent_picture_matching_flag shall be equal to 0.

NOTE 1: For the stereoscopic content that uses equivalent region-wise packing for the constituent pictures, setting this flag equal to 1 allows more compact signalling of region-wise packing information.

scale_factor_flag equal to 1 specifies that scale_factor_proj and scale_factor_packed are signaled. scale_factor_flag equal to 0 specifies that scale_factor_proj and scale_factor_packed are not signaled and inferred to be 0.

NOTE 2: Setting this flag equal to 1 together with setting at least one of scale_factor_proj and scale_factor_packed to a non-zero value, allows for more compact signalling of region-wise packing information.

scale_factor_proj specify the scale factor to be used to reconstruct the parameters for the projected regions. scale_factor_proj equal to 0 specifies that the values for the projected regions have not been scaled.

scale_factor_packed specify the scale factor to be used to reconstruct the parameters for the packed regions. scale_factor_proj equal to 0 specifies that the values for the packed regions have not been scaled.

num_regions specifies the number of packed regions when constituent_picture_matching_flag is equal to 0. Value 0 is reserved. When constituent_picture_matching_flag is equal to 1, the total number of packed regions is equal to 2*num_regions and the information in RectRegionPacking(i) and GuardBand(i) applies to each constituent picture of the projected picture and the packed picture.

proj_picture_width and proj_picture_height specify the width and height, respectively, of the projected picture, in relative projected picture sample units. proj_picture_width and proj_picture_height shall both be greater than 0.

NOTE 2: The same sampling grid, width, and height are used for the luma sample array and the chroma sample arrays of the projected picture.

packed_picture_width and packed_picture_height specify the width and height, respectively, of the packed picture, in relative packed picture sample units. packed_picture_width and packed_picture_height shall both be greater than 0.

guard_band_flag[i] equal to 0 specifies that the i-th packed region has no guard bands. guard_band_flag[i] equal to 1 specifies that the i-th packed region has at least one guard band.

packing_type[i] specifies the type of region-wise packing. The values of packing_type[i] and their semantics are specified in Table 5.2.

RectRegionPacking(i, scale_factor_proj, scale_factor_packed) specifies the region-wise packing between the i-th packed region and the i-th projected region. The syntax and semantics of RectRegionPacking(i, scale_factor_proj, scale_factor_packed) are specified in clauses 0 and 0, respectively.

GuardBand(i) specifies the guard bands for the i-th packed region. The syntax and semantics of GuardBand(i) are specified in clauses 0 and 0, respectively.

---

7.5.3.8 Derivation of region-wise packing variables and constraints for the syntax elements of the region-wise packing structure When the i-th packed region as specified by this RegionWisePackingStruct overlaps with the j-th packed region specified by the same RegionWisePackingStruct, the i-th and j-th projected regions shall reside in different constituent pictures for any values of i and j that are not equal to each other. The i-th packed region as specified by this RegionWisePackingStruct shall not overlap with any guard band specified by the same RegionWisePackingStruct. The guard bands associated with the i-th packed region, if any, as specified by this RegionWisePackingStruct shall not overlap with any packed region specified by the same RegionWisePackingStruct or any other guard bands specified by the same RegionWisePackingStruct.

NOTE: Projected regions are allowed to overlap. When projected regions overlap and a quality difference is indicated between the projected regions, e.g., by a region-wise quality ranking indication, the packed region that is indicated to have the highest quality among the packed regions corresponding to the projected regions that overlap should be used for rendering the overlapping area.

The variables NumRegions, PackedRegLeft[n], PackedRegTop[n], PackedRegWidth[n], PackedRegHeight[n], ProjRegLeft[n], ProjRegTop[n], ProjRegWidth[n], ProjRegHeight[n], TrasnformType[n], PackingType[n] are derived as follows:
- For n in the range of 0 to num_regions - 1, inclusive, the following applies:
    ○ If scale_factor_packed > 0, the following applies:
        ■ **PackedRegLeft[n]is set equal to packed_reg_left[n] * scale_factor_packed.**
        ■ **PackedRegTop[n]is set equal to packed_reg_top[n]* scale_factor_packed.**
        ■ **PackedRegWidth[n]is set equal to packed_reg_width[n]* scale_factor_packed.**
        ■ **PackedRegHeight[n]is set equal to packed_reg_height[n]* scale_factor_packed.**
    ○ Otherwise the following applies:
        ■ PackedRegLeft[n] is set equal to packed_reg_left[n].
        ■ PackedRegTop[n] is set equal to packed_reg_top[n].
        ■ PackedReg Width[n] is set equal to packed_reg_width[n].

7.5.3.8 Derivation of region-wise packing variables and constraints for the syntax elements of the region-wise packing structure

- PackedRegHeight[n] is set equal to packed_reg_height[n].
- If scale_factor_proj > 0, the following applies:
  - **ProjRegLeft[n] is set equal to proj_reg_left[n]* scale_factor_proj.**
  - **ProjRegTop[n] is set equal to proj_reg_top[n]* scale_factor_proj.**
  - **ProjRegWidth[n] is set equal to proj_reg_width[n]* scale_factor_proj.**
  - **ProjRegHeight[n] is set equal to proj_reg_height[n] * scale_factor_proj.**
- Otherwise the following applies:
  - ProjRegLeft[n] is set equal to proj_reg_left[n].
  - ProjRegTop[n] is set equal to proj_reg_top[n].
  - ProjRegWidth[n] is set equal to proj_reg_width[n].
  - ProjRegHeight[n] is set equal to proj_reg_height[n].
- TransformType[n] is set equal to transform_type[n].
- PackingType[n] is set equal to packing_type[n].

- If constituent_picture_matching_flag is equal to 0, the following applies:
  - NumRegions is set equal to num_regions.
- Otherwise (constituent_picture_matching_flag is equal to 1), the following applies:
  - NumRegions is set equal to 2 * num_regions.
  - When TopBottomFlag is equal to 1, the following applies:
    - projLeftOffset and packedLeftOffset are both set equal to 0.
    - projTopOffset is set equal to proj_picture_height / 2 and packedTopOffset is set equal to packed_picture_height / 2.
  - When SideBySideFlag is equal to 1, the following applies:
    - projLeftOffset is set equal to proj_picture_width / 2 and packedLeftOffset is set equal to packed_picture_width / 2.
    - projTopOffset and packedTopOffset are both set equal to 0.
  - For n in the range of NumRegions / 2 to NumRegions - 1, inclusive, the following applies:
    - nIdx is set equal to n - NumRegions / 2.
    - If scale_factor_packed > 0, the following applies:
      - **PackedRegLeft[n] is set equal to packed_reg_left[nIdx]* scale_factor_packed + packedLeftOffset.**
      - **PackedRegTop[n] is set equal to packed_reg_top[nIdx]* scale_factor_packed + packedTopOffset.**
      - **PackedRegWidth[n] is set equal to packed_reg_width[nIdx]* scale_factor_packed.**
      - PackedRegHeight[n] is set equal to packed_reg_height[nIdx] scale_factor_packed.
    - Otherwise the following applies:
      - PackedRegLeft[n] is set equal to packed_reg_left[nIdx] + packedLeftOffset.
      - PackedRegTop[n] is set equal to packed_reg_top[nIdx] + packedTopOffset.
      - PackedRegWidth[n] is set equal to packed_reg_width[nIdx].
      - PackedRegHeight[n] is set equal to packed_reg_height[nIdx].
    - If scale_factor_proj > 0, the following applies:
      - **ProjRegLeft[n] is set equal to proj_reg_left[nIdx]* scale_factor_proj + projLeftOffset.**
      - **ProjRegTop[n] is set equal to proj_reg_top[nIdx]* scale_factor_proj + proj TopOffset.**
      - **ProjRegWidth[n] is set equal to proj_reg_width[nIdx]* scale_factor_proj.**
      - **ProjRegHeight[n] is set equal to proj_reg_height[nIdx]* scale_factor_proj.**
    - Otherwise the following applies:
      - ProjRegLeft[n] is set equal to proj_reg_left[nIdx] + projLeftOffset.
      - ProjRegTop[n] is set equal to proj_reg_top[nIdx] + projTopOffset.

| |
|---|
| 7.5.3.8 Derivation of region-wise packing variables and constraints for the syntax elements of the region-wise packing structure |
| • ProjRegWidth[n] is set equal to proj_reg_width[nIdx].<br>• ProjRegHeight[n] is set equal to proj_reg_heighT[nldx].<br>■ TransformType[n] is set equal to transform_type[nIdx].<br>■ PackingType[n] is set equal to packing_type[nIdx].<br>For each value of n in the range of 0 to NumRegions - 1, inclusive, the values of ProjRegWidth[n], ProjRegHeight[n], ProjRegTop[n], and ProjRegLeft[n] are constrained as follows:<br>  - ProjRegWidth[n] shall be in the range of 1 to proj_picture_width, inclusive.<br>  - ProjRegHeight[n] shall be in the range of 1 to proj_picture_height, inclusive.<br>  - ProjRegLeft[n] shall be in the range of 0 to proj_picture_width - 1, inclusive.<br>  - ProjRegTop[n] shall be in the range of 0 to proj_picture_height - 1, inclusive.<br>  - If ProjRegTop[n] is less than proj_picture_height / VerDiv1, the sum of ProjRegTop[n] and ProjRegHeight[n] shall be less than or equal to proj_picture_height / VerDiv1. Otherwise, the sum of ProjRegTop[n] and ProjRegHeight[n] shall be less than or equal to proj_picture_height / VerDiv1 *2.<br>For each value of n in the range of 0 to NumRegions - 1, inclusive, the values of PackedRegWidth[n], PackedRegHeight[n], PackedRegTop[n], and PackedRegLeft[n] are constrained as follows:<br>  - PackedReg Width[n] shall be in the range of 1 to packed_picture_width, inclusive.<br>  - PackedRegHeight[n] shall be in the range of 1 to packed_picture_height, inclusive.<br>  - PackedRegLeft[n] shall be in the range of 0 to packed_picture_width - 1, inclusive.<br>  - PackedRegTop[n] shall be in the range of 0 to packed_picture_height -1, inclusive.<br>  - If PackedRegLeft[n] is less than packed_picture_width / HorDiv1, the sum of PackedRegLeft[n] and PackedReg Width[n] shall be less than or equal to packed_picture_width / HorDiv1. Otherwise, the sum of PackedRegLeft[n] and PackedRegWidth[n] shall be less than or equal to packed_picture_width / HorDiv1 *2.<br>  - If PackedRegTop[n] is less than packed_picture_height / VerDiv1, the sum of PackedRegTop[n] and PackedRegHeight[n] shall be less than or equal to packed_picture_height / VerDiv1. Otherwise, the sum of PackedRegTop[n] and PackedRegHeight[n] shall be less than or equal to packed_picture_height / VerDiv1 *2.<br>  - When the decoded picture has 4:2:0 or 4:2:2 chroma format, PackedRegLeft[n] shall correspond to an even horizontal coordinate value of luma sample units, and PackedRegWidth[n] shall correspond to an even number of luma samples, both within the decoded picture.<br>  - When the decoded picture has 4:2:0 chroma format, PackedRegTop[n] shall correspond to an even vertical coordinate value of luma sample units, and ProjRegHeight[n] shall correspond to an even number of luma samples, both within the decoded picture. |

APPENDIX B—PROPOSED SPECIFICATION TEXT FOR EMBODIMENT 2

The following is an example of how the full specification text of the current OMAF working draft (m42923v1) could be modified to support embodiment 2, with changes to the current specification highlighted using bold font.

7.5.3 Region-wise packing structure 7.5.3.1 Definition

RegionWisePackingStruct specifies the mapping between packed regions and the respective projected regions and specifies the location and size of the guard bands, if any.

NOTE: Among other information the RegionWisePackingStruct also provides the content coverage information in the 2D Cartesian picture domain.

A decoded picture in the semantics of this clause is either one of the following depending on the container for this syntax structure:

For video, the decoded picture is the decoding output resulting from a sample of the video track.

For an image item, the decoded picture is a reconstructed image of the image item.

The content of RegionWisePackingStruct is informatively summarized below, while the normative semantics follow subsequently in this clause:

The width and height of the projected picture are explicitly signalled with proj_picture_width and proj_picture_height, respectively.

The width and height of the packed picture are explicitly signalled with packed_picture_width and packed_picture_height, respectively.

When the projected picture is stereoscopic and has the top-bottom or side-by-side frame packing arrangement, constituent_picture_matching_flag equal to 1 specifies that the projected region information, packed region information, and guard band region information in this syntax structure apply individually to each constituent picture, the packed picture and the projected picture have the same stereoscopic frame packing format, and the number of projected regions and packed regions is double of that indicated by the value of num_regions in the syntax structure.

When the projected regions have equal size, the flag proj_reg_equal_size_flag equal to 1 enables a compact description of the width and height of the projected regions.

When the packed regions have equal size the flag packed_reg_equal_size_flag equal to 1 enables a compact description of the width and height of the packed regions.

When the projected regions are ordered in raster scan order, the flag proj_raster_scan_order_flag equal to 1 enables a compact description of the top and left offsets of the projected regions.

When the packed regions are ordered in raster scan order, the flag packed_raster_scan_order_flag equal to 1 enables a compact description of the top and left offsets of the packed regions.

RegionWisePackingStruct contains a loop, in which a loop entry corresponds to the respective projected regions and packed regions in both constituent pictures (when constituent_picture_matching_flag equal to 1) or to a projected region and the respective packed region (when constituent_picture_matching_flag equal to 0), and the loop entry the contains the following:

a flag indicating the presence of guard bands for the packed region, the packing type (however, only rectangular region-wise packing is specified in this document), the mapping between a projected region and the respective packed region in the rectangular region packing structure RectRegionPacking(i, proj_reg_equal_size_flag, packed_reg_equal_size_flag, proj_raster_scan_order_flag, packed_raster_scan_order_flag), when guard bands are present, the guard band structure for the packed region GuardBand(i).

The content of the rectangular region packing structure RectRegionPacking(i, proj_reg_equal_size_flag, packed_reg_equal_size_flag, proj_raster_scan_order_flag, packed_raster_scan_order_flag) is informatively summarized below, while the normative semantics follow subsequently in this clause:

proj_reg_width[i], proj_reg_height[i], proj_reg_top[i], and proj_reg_left[i] specify the width, height, top offset, and left offset, respectively, of the i-th projected region.

transform_type[i] specifies the rotation and mirroring, if any, that are applied to the i-th packed region to remap it to the i-th projected region.

packed_reg_width[i], packed_reg_height[i], packed_reg_top[i], and packed_reg_left[i] specify the width, height, the top offset, and the left offset, respectively, of the i-th packed region.

The content of the guard band structure GuardBand(i) is informatively summarized below, while the normative semantics follow subsequently in this clause:

left_gb_width[i], right_gb_width[i], top_gb_height[i], or bottom_gb_height[i] specify the guard band size on the left side of, the right side of, above, or below, respectively, the i-th packed region.

gb_not_used_for_pred_flag[i] indicates if the encoding was constrained in a manner that guards bands are not used as a reference in the inter prediction process.

gb_type[i][j] specifies the type of the guard bands for the i-th packed region.

FIG. 7-2 illustrates an example of the position and size of a projected region within a projected picture (on the left side) as well as that of a packed region within a packed picture with guard bands (on the right side). This example applies when the value of constituent_picture_matching_flag is equal to 0.

. . .

This clause is organized as follows:

The syntax and semantics of the rectangular region packing structure are specified in clauses 7.5.3.2 and 7.5.3.3, respectively.

The syntax and semantics of the guard band structure are specified in clauses 7.5.3.4 and 7.5.3.5, respectively.

The syntax and semantics of the region-wise packing structure are specified in clauses 7.5.3.6 and 7.5.3.7, respectively.

Clause 7.5.3.8 derives variables from syntax element values of the rectangular region packing, guard band, region-wise packing structures. Clause 7.5.3.8 also uses the variables to specify constraints for the syntax element values. The variables are also used in other clauses.

7.5.3.2 Syntax of the rectangular region packing structure

```
aligned(8) class RectRegionPacking(i,
    proj_reg_equal_size_flag,
    packed_reg_equal_size_flag,
    proj_raster_scan_order_flag,
    packed_raster_scan_order_flag) {
if (proj_reg_equal_size_flag) {
    if (i == 0) {
        unsigned int(32) proj_reg_width[0];
        unsigned int(32) proj_reg_height[0];
    }
} else {
    unsigned int(32) proj_reg_width[i];
    unsigned int(32) proj_reg_height[i];
}
if (!proj_raster_scan_order_flag) {
    unsigned int(32) proj_reg_top[i];
    unsigned int(32) proj_reg_left[i];
}
unsigned int(3) transform_type[i];
bit(5) reserved = 0;
if (packed_reg_equal_size_flag) {
    if (i == 0) {
        unsigned int(16) packed_reg_width[0];
        unsigned int(16) packed_reg_height[0];
    }
} else {
    unsigned int(16) packed_reg_width[i];
    unsigned int(16) packed_reg_height[i];
}
if (!packed_raster_scan_order_flag) {
    unsigned int(16) packed_reg_top[i];
    unsigned int(16) packed_reg_left[i];
}
}
```

7.5.3.3 Semantics of the rectangular region packing structure proj_reg_width[i], proj_reg_height[i], proj_reg_top[i], and proj_reg_left[i] specify the width, height, top offset, and left offset, respectively, of the i-th projected region, either within the projected picture (when constituent_picture_matching_flag is equal to 0) or within the constituent picture of the projected picture (when constituent_picture_matching_flag is equal to 1). proj_reg_width[i], proj_reg_height[i], proj_reg_top[i] and proj_reg_left[i] are indicated in relative projected picture sample units.

NOTE 1: Two projected regions may partially or entirely overlap with each other. When there is an indication of quality difference, e.g., by a region-wise quality ranking indication, then for the overlapping area of any two overlapping projected regions, the packed region corresponding to the projected region that is indicated to have higher quality should be used for rendering.

transform_type[i] specifies the rotation and mirroring that is applied to the i-th packed region to remap it to the i-th projected region. When transform_type[i] specifies both rotation and mirroring, rotation is applied before mirroring for converting sample locations of a packed region to sample locations of a projected region. The following values are specified:
0: no transform
1: mirroring horizontally
2: rotation by 180 degrees (counter-clockwise)
3: rotation by 180 degrees (counter-clockwise) before mirroring horizontally
4: rotation by 90 degrees (counter-clockwise) before mirroring horizontally
5: rotation by 90 degrees (counter-clockwise)
6: rotation by 270 degrees (counter-clockwise) before mirroring horizontally
7: rotation by 270 degrees (counter-clockwise)

NOTE 2: Clause 5.4.2 specifies the semantics of transform_type[i] for converting a sample location of a packed region in a packed picture to a sample location of a projected region in a projected picture.

packed_reg_width[i], packed_reg_height[i], packed_reg_top[i], and packed_reg_left[i] specify the width, height, the offset, and the left offset, respectively, of the i-th packed region, either within the packed picture (when constituent_picture_matching_flag is equal to 0) or within each constituent picture of the packed picture (when constituent_picture_matching_flag is equal to 1). packed_reg_width[i], packed_reg_height[i], packed_reg_top[i], and packed_reg_left[i] are indicated in relative packed picture sample units. packed_reg_width[i], packed_reg_height[i], packed_reg_top[i], and packed_reg_left[i] shall represent integer horizontal and vertical coordinates of luma sample units within the decoded pictures.

NOTE 3: Two packed regions may partially or entirely overlap with each other.

7.5.3.4 Syntax of the guard band structure

```
aligned(8) class GuardBand(i) {
    unsigned int(8) left_gb_width[i];
    unsigned int(8) right_gb_width[i];
    unsigned int(8) top_gb_height[i];
    unsigned int(8) bottom_gb_height[i];
    unsigned int(1) gb_not_used_for_pred_flag[i];
    for (j=0; j<4; j++) unsigned int(3) gb_type[i][j];
    bit(3) reserved=0;
}
```

7.5.3.5 Semantics of the guard band structure left_gb_width[i] specifies the width of the guard band on the left side of the i-th packed region in relative packed picture sample units. When the decoded picture has 4:2:0 or 4:2:2 chroma format, left_gb_width[i] shall correspond to an even number of luma samples within the decoded picture.

right_gb_width[i] specifies the width of the guard band on the right side of the i-th packed region in relative packed picture sample units. When the decoded picture has 4:2:0 or 4:2:2 chroma format, right_gb_width[i] shall correspond to an even number of luma samples within the decoded picture.

top_gb_height[i] specifies the height of the guard band above the i-th packed region in relative packed picture sample units. When the decoded picture has 4:2:0 chroma format, top_gb_height[i] shall correspond to an even number of luma samples within the decoded picture.

bottom_gb_height[i] specifies the height of the guard band below the i-th packed region in relative packed picture sample units. When the decoded picture has 4:2:0 chroma format, bottom_gb_height[i] shall correspond to an even number of luma samples within the decoded picture.

When GuardBand(i) is present, at least one of left_gb_width[i], right_gb_width[i], top_gb_height[i], or bottom_gb_height[i] shall be greater than 0.

gb_not_used_for_pred_flag[i] equal to 0 specifies that the guard bands may or may not be used in the inter prediction process. gb_not_used_for_pred_flag[i] equal to 1 specifies that the sample values of the guard bands are not used in the inter prediction process.

NOTE 1: When gb_not_used_for_pred_flag[i] is equal to 1, the sample values within guard bands in decoded pictures could be rewritten even if the decoded pictures were used as references for inter prediction of subsequent pictures to be decoded. For example, the content of a packed region could be seamlessly expanded to its guard band with decoded and re-projected samples of another packed region.

gb_type[i][j] specifies the type of the guard bands for the i-th packed region as follows, with j equal to 0, 1, 2, or 3 indicating that the semantics below apply to the left, right, top, or bottom edge, respectively, of the packed region:

gb_type[i][j] equal to 0 specifies that the content of the guard bands in relation to the content of the packed regions is unspecified. When gb_not_used_for_pred_flag[i] is equal to 0, gb_type[i][j] shall not be equal to 0.

gb_type[i][j] equal to 1 specifies that the content of the guard bands suffices for interpolation of sub-pixel values within the packed region and less than one pixel outside of the boundary of the packed region.

NOTE 2: gb_type[i][j] equal to 1 could be used when the boundary samples of a packed region have been copied horizontally or vertically to the guard band.

gb_type[i][j] equal to 2 specifies that the content of the guard bands represents actual picture content that is spherically adjacent to the content in the packed region and is on the surface of the packed region at quality that gradually changes from the picture quality of the packed region to that of the spherically adjacent packed region.

gb_type[i][j] equal to 3 specifies that the content of the guard bands represents actual picture content that is spherically adjacent to the content in the packed region and is on the surface of the packed region at the picture quality of the packed region.

gb_type[i][j] values greater than 3 are reserved.

---

7.5.3.6 Syntax the region-wise packing structure

```
aligned(8) class RegionwisePackingStruct( ) {
    unsigned int(1) constituent_picture_matching_flag;
    unsigned int(1) proj_reg_equal_size_flag;
    unsigned int(1) packed_reg_equal_size_flag;
    unsigned int(1) proj_raster_scan_order_flag;
    unsigned int(1) packed_raster_scan_order_flag;
    bit(7) reserved = 0;
    bit(3) reserved = 0;
    unsigned int(8) num_regions;
    unsigned int(32) proj_picture_width;
    unsigned int(32) proj_picture_height;
    unsigned int(16) packed_picture_width;
    unsigned int(16) packed_picture_height;
    for (i = 0; i < num_regions; i++) {
        bit(3) reserved = 0;
        unsigned int(1) guard_band_flag[i];
        unsigned int(4) packing_type[i];
        if (packing_type[i] == 0) {
            RectRegionPacking(i,
                proj_reg_equal_size_flag,
                packed_reg_equal_size_flag,
                proj_raster_scan_order_flag,
                packed_raster_scan_order_flag);
            if (guard_band_flag[i])
                GuardBand(i);
        }
    }
}
```

---

7.5.3.7 Semantics of the region-wise packing structure constituent_picture_matching_flag equal to 1 specifies that the projected region information, packed region information, and guard band region information in this syntax structure apply individually to each constituent picture and that the packed picture and the projected picture have the same stereoscopic frame packing format. constituent_picture_matching_flag equal to 0 specifies that the projected region information, packed region information, and guard band region information in this syntax structure apply to the projected picture. When SpatiallyPackedStereoFlag is equal to 0, constituent_picture_matching_flag shall be equal to 0.

NOTE 1: For the stereoscopic content that uses equivalent region-wise packing for the constituent pictures, setting this flag equal to 1 allows more compact signalling of region-wise packing information.

proj_reg_equal_size_flag equal to 1 specifies that all regions of the projected picture have the same width and height. The regions in the left column of the picture may have a shorter width than regions in other columns and the regions at the bottom row of the picture may have a shorter height than regions in other rows. proj_reg_equal_size_flag equal to 0 specifies that all regions of the projected picture may not have equal size.

NOTE 2: For projected regions where the regions have equal size, setting this flag equal to 1 allows more compact signalling of region-wise packing information by only signalling the size for the first region.

packed_reg_equal_size_flag equal to 1 specifies that all regions of the packed picture have the same width and height. The regions in the left column of the picture may have a shorter width than regions in other columns and the regions at the bottom row of the picture may have a shorter height than regions in other rows. packed_reg_equal_size_flag equal to 0 specifies that all regions of the packed picture may not have equal size.

NOTE 3: For packed regions where the regions have equal size, setting this flag equal to 1 allows more compact signalling of region-wise packing information by only signalling the size for the first region.

proj_raster_scan_order_flag equal to 1 specifies that all regions of the projected picture are ordered in raster scan order. For stereoscopic frame packing formats the regions are ordered in raster scan order for each stereo view. proj_raster_scan_order_flag equal to 0 specifies that all regions of the projected picture may not be orderered in raster scan order.

NOTE 4: For projected regions where the regions are ordered in raster scan order, setting this flag equal to 1 allows more compact signalling of region-wise packing information by deriving the region offsets from the region width and region height.

packed_raster_scan_order_flag equal to 1 specifies that all regions of the packed picture are ordered in raster scan order. For stereoscopic frame packing formats the regions are ordered in raster scan order for each stereo view. packed_raster_scan_order_flag equal to 0 specifies that all regions of the packed picture may not be ordered in raster scan order.

NOTE 5: For packed regions where the regions are ordered in raster scan order, setting this flag equal to 1 allows more compact signalling of region-wise packing information by deriving the region offsets from the region width and region height.

num_regions specifies the number of packed regions when constituent_picture_matching_flag is equal to 0. Value 0 is reserved. When constituent_picture_matching_flag is equal to 1, the total number of packed regions is equal to 2*num_regions and the information in RectRegionPacking(i) and GuardBand(i) applies to each constituent picture of the projected picture and the packed picture.

proj_picture_width and proj_picture_height specify the width and height, respectively, of the projected picture, in relative projected picture sample units. proj_picture_width and proj_picture_height shall both be greater than 0.

NOTE 4: The same sampling grid, width, and height are used for the luma sample array and the chroma sample arrays of the projected picture.

packed_picture_width and packed_picture_height specify the width and height, respectively, of the packed picture, in relative packed picture sample units. packed_picture_width and packed_picture_height shall both be greater than 0.

guard_band_flag[i] equal to 0 specifies that the i-th packed region has no guard bands. guard_band_flag[i] equal to 1 specifies that the i-th packed region has at least one guard band.

packing_type[i] specifies the type of region-wise packing. The values of packing_type[i] and their semantics are specified in Table 5.2.

RectRegionPacking(i) specifies the region-wise packing between the i-th packed region and the i-th projected region. The syntax and semantics of RectRegionPacking(i) are specified in clauses 7.5.3.2 and 7.5.3.3, respectively.

GuardBand(i) specifies the guard bands for the i-th packed region. The syntax and semantics of GuardBand(i) are specified in clauses 7.5.3.4 and 7.5.3.5, respectively.

7.5.3.8 Derivation of region-wise packing variables and constraints for the syntax elements of the region-wise packing structure When the i-th packed region as specified by this RegionwisePackingStruct overlaps with the j-th packed region specified by the same RegionWisePackingStruct, the i-th and j-th projected regions shall reside in different constituent pictures for any values of i and j that are not equal to each other. The i-th packed region as specified by this RegionWisePackingStruct shall not overlap with any guard band specified by the same RegionWisePackingStruct.

The guard bands associated with the i-th packed region, if any, as specified by this RegionwisePackingStruct shall not overlap with any packed region specified by the same RegionWisePackingStruct or any other guard bands specified by the same RegionWisePackingStruct.

> NOTE: Projected regions are allowed to overlap. When projected regions overlap and a quality difference is indicated between the projected regions, e.g., by a region-wise quality ranking indication, the packed region that is indicated to have the highest quality among the packed regions corresponding to the projected regions that overlap should be used for rendering the overlapping area.

The variables NumRegions, PackedRegLeft[n], PackedRegTop[n], PackedRegWidth[n], PackedRegHeight[n], ProjRegLeft[n], ProjRegTop[n], ProjRegWidth[n], ProjRegHeight[n], TrasnformType[n], PackingType[n] are derived as follows:
- For n in the range of 0 to num_regions - 1, inclusive, the following applies:
  ○ If packed_raster_scan_order_flag is equal to 1, the following applies:
    - PackedRegLeft[n] is set equal to the x-position of the first (x, y)-point in raster scan order of the packed picture not already
    - PackedRegTop[n] is set equal to the y-position of the first (x, y)-point in raster scan order of the packed picture not already occupied by a region.
    NOTE: If packed_reg_equal_size_flag also equals 1, then this is defined as:
      - **PackedRegLeft[n] is set equal to (n%Ceil(wp/wr))*wr, where wp is packed_picture_width/HorDiv1 and wr is packed_reg_width[0].**
      - **PackedRegTop[n] is set equal to Floor(n/Ceil(wp/wr))*hr, where wp is packed_picture_width/HorDiv1, wr is packed_reg_width[0] and hr is packed_reg_height[0].**
  ○ Otherwise the following applies:
    - PackedRegLeft[n] is set equal to packed_reg_left[n].
    - PackedRegTop[n] is set equal to packed_reg_top[n].
  ○ If packed_reg_equal_size_flag is equal to 1, the following applies:
    - If packed_reg_width[0] > packed_picture_width/HorDiv1 - PackedRegLeft[n] then PackedRegWidth[n] is set equal to packed_picture_width/HorDiv1 - PackedRegLeft[n]. Otherwise, PackedRegWidth[n] is set equal to packed_reg_width[0].
    - If packed_reg_height[0] > packed_picture_height/VerDiv1 - PackedRegTop[n] then PackedRegHeight[n] is set equal to packed_picture_height/VerDiv1 - PackedRegTop[n]. Otherwise, PackedRegHeight[n] is set equal to packed_reg_height[0].
  ○ Otherwise the following applies:
    - PackedReg Width[n] is set equal to packed_reg_width[n].
    - PackedRegHeight[n] is set equal to packed_reg_height[n].
  ○ If proj_raster_scan_order_flag is equal to 1, the following applies:
    - ProjRegLeft[n] is set equal to the x-position of the first (x, y)-point in raster scan order of the projected picture not already occupied by a region.
    - ProjRegTop[n] is set equal to the y-position of the first (x, y)-point in raster scan order of the projected picture not already occupied by a region.

-continued 7.5.3.8 Derivation of region-wise packing variables and constraints for the syntax elements of the region-wise packing structure

- ○ Otherwise the following applies:
  - ■ ProjRegLeft[n] is set equal to proj_reg_left[n].
  - ■ ProjRegTop[n] is set equal to proj_reg_top[n].
- ○ If proj_reg_equal_size_flag is equal to 1, the following applies:
  - ■ If proj_reg_width[0]> proj_picture_width/HorDiv1 - ProjRegLeft[n]then ProjRegWidth[n]is set equal to proj_picture_width/HorDiv1 - ProjRegLeft[n]. Otherwise, ProjRegWidth[n]is set equal to proj_reg_width[0].
  - ■ If proj_reg_height[0]> proj_picture_height/VerDiv1 - ProjRegTop[n]then ProjRegHeight[n]is set equal to proj_picture_height/VerDiv1 - ProjRegTop[n]. Otherwise, ProjRegHeight[n]is set equal to proj_reg_height[0].
- ○ Otherwise the following applies:
  - ■ ProjReg Width[n] is set equal to proj_reg_width[n].
  - ■ ProjRegHeight[n] is set equal to proj_reg_height[n].
- ○ TransformType[n] is set equal to transform_type[n].
- ○ PackingType[n] is set equal to packing_type[n].
- If constituent_picture_matching_flag is equal to 0, the following applies:
  - ○ NumRegions is set equal to num_regions.
- Otherwise (constituent_picture_matching_flag is equal to 1), the following applies:
  - ○ NumRegions is set equal to 2 * num_regions.
  - ○ When TopBottomFlag is equal to 1, the following applies:
    - ○ projLeftOffset and packedLeftOffset are both set equal to 0.
    - ○ projTopOffset is set equal to proj_picture_height / 2 and packedTopOffset is set equal to packed_picture_height / 2.
  - ○ When SideBySideFlag is equal to 1, the following applies:
    - ○ projLeftOffset is set equal to proj_picture_width / 2 and packedLeftOffset is set equal to packed_picture_width /2.
    - ○ projTopOffset and packedTopOffset are both set equal to 0.
  - ○ For n in the range of NumRegions / 2 to NumRegions - 1, inclusive, the following applies:
    - ■ nIdx is set equal to n - NumRegions / 2.
    - ■ If packed_raster_scan_order_flag is equal to 1, the following applies:
      - • PackedRegLeft[n]is set equal to the x-position + packedLeftOffset of the first (x, y)-point in raster scan order of the packed picture not already occupied by a region.
      - • PackedRegTop[n]is set equal to the y-position + packedTopOffset of the first (x, y)-point in raster scan order of the packed picture not already occupied by a region.
    - ■ Otherwise the following applies:
      - • PackedRegLeft[n] is set equal to packed_reg_left[nIdx] + packedLeftOffset.
      - • PackedRegTop[n] is set equal to packed_reg_top[nIdx] + packedTopOffset.
    - ■ If packed_reg_equal_size_flag is equal to 1, the following applies:
      - • If packed_reg_width[0]> packed_picture_width/HorDiv1 + packedLeftOffset - PackedRegLeft[n]then PackedRegWidth[n]is set equal to packed_picture_width/HorDiv1 + packedLeftOffset - PackedRegLeft[n]. Otherwise, PackedRegWidth[n]is set equal to packed_reg_width[0].
      - • If packed_reg_height[0]> packed_picture_height/VerDiv1 + packedTopOffset - PackedRegTop[n]then PackedRegHeight[n]is set equal to packed_picture_height/VerDiv1 + packedTopOffset - PackedRegTop[n]. Otherwise, PackedRegHeight[n]is set equal to packed_reg_height[0].
    - ■ Otherwise the following applies:
      - • PackedRegWidth[n] is set equal to packed_reg_width[nIdx].
      - • PackedRegHeight[n] is set equal to packed_reg_height[nIdx].
    - ■ If proj_raster_scan_order_flag is equal to 1, the following applies:
      - • ProjRegLeft[n]is set equal to the x-position + projLeftOffset of the first (x, y)-point in raster scan order of the projected picture not already occupied by a region.

7.5.3.8 Derivation of region-wise packing variables and constraints for the syntax elements of the region-wise packing structure

- ProjRegTop[n] is set equal to the y-position + projTopOffset of the first (x, y)-point in raster scan order of the projected picture not already occupied by a region.
- Otherwise the following applies:
  - ProjRegLeft[n] is set equal to proj_reg_left[nIdx] + projLeftOffset.
  - ProjRegTop[n] is set equal to proj_reg_top[nIdx] + projTopOffset.
- If proj_reg_equal_size_flag is equal to 1, the following applies:
  - If proj_reg_width[0] > proj_picture_width/HorDiv1 + projLeftOffset - ProjRegLeft[n] then ProjRegWidth[n] is set equal to proj_picture_width/HorDiv1 + projLeftOffset - ProjRegLeft[n]. Otherwise, ProjRegWidth[n] is set equal to proj_reg_width[0].
  - If proj_reg_height[0] > proj_picture_height/VerDiv1 + projTopOffset - ProjRegTop[n] then ProjRegHeight[n] is set equal to proj_picture_height/VerDiv1 + projTopOffset - ProjRegTop[n]. Otherwise, ProjRegHeight[n] is set equal to proj_reg_height[0].
- Otherwise the following applies:
  - ProjRegWidth[n] is set equal to proj_reg_width[nIdx].
  - ProjRegHeight[n] is set equal to proj_reg_height[nIdx].
- TransformType[n] is set equal to transform_type[nIdx].
- PackingType[n] is set equal to packing_type[nIdx].

For each value of n in the range of 0 to NumRegions - 1, inclusive, the values of ProjRegWidth[n], ProjRegHeight[n], ProjRegTop[n], and ProjRegLeft[n] are constrained as follows:
- ProjReg Width[n] shall be in the range of 1 to proj_picture_width, inclusive.
- ProjRegHeight[n] shall be in the range of 1 to proj_picture_height, inclusive.
- ProjRegLeft[n] shall be in the range of 0 to proj_picture_width - 1, inclusive.
- ProjRegTop[n] shall be in the range of 0 to proj_picture_height - 1, inclusive.
- If ProjRegTop[n] is less than proj_picture_height / VerDiv1, the sum of ProjRegTop[n] and ProjRegHeight[n] shall be less than or equal to proj_picture_height / VerDiv1. Otherwise, the sum of ProjRegTop[n] and ProjRegHeight[n] shall be less than or equal to proj_picture_height / VerDiv1 * 2.

For each value of n in the range of 0 to NumRegions - 1, inclusive, the values of PackedRegWidth[n], PackedRegHeight[n], PackedRegTop[n], and PackedRegLeft[n] are constrained as follows:
- PackedReg Width[n] shall be in the range of 1 to packed_picture_width, inclusive.
- PackedRegHeight[n] shall be in the range of 1 to packed_picture_height, inclusive.
- PackedRegLeft[n] shall be in the range of 0 to packed_picture_width - 1, inclusive.
- PackedRegTop[n] shall be in the range of 0 to packed_picture_height -1, inclusive.
- If PackedRegLeft[n] is less than packed_picture_width / HorDiv1, the sum of PackedRegLeft[n] and PackedRegWidth[n] shall be less than or equal to packed_picture_width / HorDiv1. Otherwise, the sum of PackedRegLeft[n] and PackedReg Width[n] shall be less than or equal to packed_picture_width / HorDiv1 * 2.
- If PackedRegTop[n] is less than packed_picture_height / VerDiv1, the sum of PackedRegTop[n] and PackedRegHeight[n] shall be less than or equal to packed_picture_height / VerDiv1. Otherwise, the sum of PackedRegTop[n] and PackedRegHeight[n] shall be less than or equal to packed_picture_height / VerDiv1 * 2.
- When the decoded picture has 4:2:0 or 4:2:2 chroma format, PackedRegLeft[n] shall correspond to an even horizontal coordinate value of luma sample units, and PackedRegWidth[n] shall correspond to an even number of luma samples, both within the decoded picture.
- When the decoded picture has 4:2:0 chroma format, PackedRegTop[n] shall correspond to an even vertical coordinate value of luma sample units, and ProjRegHeight[n] shall correspond to an even number of luma samples, both within the decoded picture.

The invention claimed is:

1. A method for signaling region information in a bitstream for region-wise unpacking of regions from a packed picture to a projected picture, the method comprising:
defining a scale factor that is common for all regions of a picture;
signaling the scale factor in the bitstream; and
for each of at least one region of a picture:
applying the scale factor to each item of the region information for the region to produce a set of scaled values; and
signaling the scaled values in the bitstream; and
including in the bitstream a sizing flag to signal whether or not all regions in the picture have a same size, wherein if the sizing flag is set to a first value, only a bit size height and bit size width of the first region of the picture is signaled, and if the sizing flag is set to a second value, the bit size height and the bit size width of each region in the picture are explicitly signaled.

2. The method of claim 1, wherein applying the scale factor to each item of the region information for the region comprises dividing the value of each item of region information by the scale factor.

3. The method of claim 1, wherein the region information comprises region width, region height, top offset of region in picture, left offset of region in picture, transform type and/or guard band information.

4. The method of claim 1, wherein the region information is for at least one of projected regions and packed regions.

5. The method of claim 1, further comprising including in the bitstream a scaling flag to signal whether or not the region information should be scaled.

6. The method of claim 1, further comprising including in the bitstream a common size flag to signal whether or not some regions in the picture have a common size.

7. The method of claim 6, wherein if the common size flag is set to a first value, the common size is signaled in the bitstream and for each region a use common size flag is included in the bitstream to signal whether the size of the region should be copied from the common size or whether the size of the region is explicitly signaled in the bitstream.

8. The method of claim 1, further comprising including in the bitstream a raster flag to signal whether or not all regions in the picture are ordered according to raster scan order.

* * * * *